(12) United States Patent
Huang

(10) Patent No.: US 6,553,076 B1
(45) Date of Patent: Apr. 22, 2003

(54) MIXED MODE TRANSCEIVER DIGITAL CONTROL NETWORK AND COLLISION-FREE COMMUNICATION METHOD

(75) Inventor: Geng Huang, Hong Kong (HK)

(73) Assignee: Actpro International Limited, New Territories (HK)

( * ) Notice: Subject to any disclaimer, the term of this patent is extended or adjusted under 35 U.S.C. 154(b) by 0 days.

(21) Appl. No.: 09/267,632

(22) Filed: Mar. 15, 1999

(51) Int. Cl.⁷ .................................................. H04B 3/00
(52) U.S. Cl. ........................................ 375/257; 375/219
(58) Field of Search ................................. 375/216, 219, 375/257, 377; 340/310.01, 438, 506; 455/39, 73

(56) References Cited

U.S. PATENT DOCUMENTS

| | | | |
|---|---|---|---|
| 3,979,723 A | 9/1976 | Hughes et al. | 370/296 |
| 4,189,713 A | 2/1980 | Duffy | 367/197 |
| 4,292,623 A | 9/1981 | Eswaran et al. | 340/825.5 |
| 4,520,488 A | 5/1985 | Houvig et al. | 375/216 |
| 4,918,690 A | 4/1990 | Markkula, Jr. et al. | 370/400 |
| 5,039,980 A | 8/1991 | Aggers et al. | 340/506 |
| 5,081,648 A | 1/1992 | Herzog | 375/258 |
| 5,148,144 A | 9/1992 | Sutterlin et al. | 340/310.01 |
| 5,383,185 A | 1/1995 | Armbuster et al. | 370/447 |
| 5,729,547 A | 3/1998 | Dute | 324/755 |

*Primary Examiner*—Stephen Chin
*Assistant Examiner*—Chieh M. Fan
(74) *Attorney, Agent, or Firm*—Hall, Priddy Myers & Vande Sande

(57) ABSTRACT

A mixed mode transceiver digital control network system is disclosed as including at least two nodes/transceivers connected with a DC power source and a cored inductor via a bus, in which each transceiver includes a current mode transmitter and a voltage mode receiver. A bi-directional voltage clamp is connected in parallel to the cored inductor. Electric current from the DC power source flows through the cored inductor and the bi-directional clamp into the bus. By reason of the flow of the electric current through the voltage clamp, a electric voltage pulse is generated and transmitted into the bus. The electric voltage pulse so transmitted into the bus is received by the voltage mode receiver and subsequently inputted into a micro-controller or processor of the node. There is also disclosed a method of setting one of a plurality of priority levels to each node forming the system, so that a node to which a higher priority level has a higher chance of transmitting its data packets. There is further disclosed a method of avoiding collision when two or more nodes/transceivers transmit their respective data packets at the same time.

45 Claims, 15 Drawing Sheets

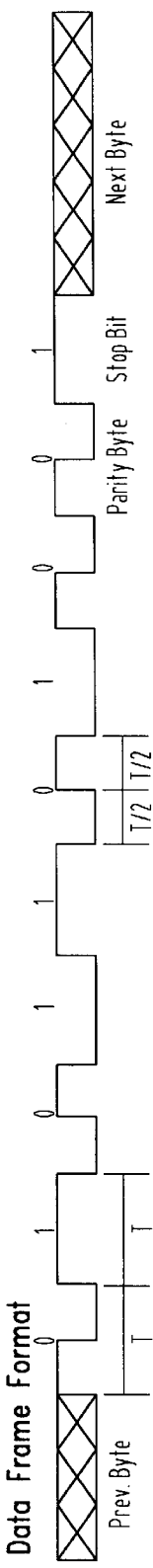
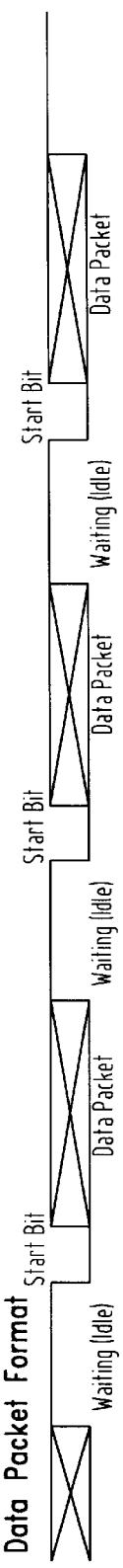
FIG.8 Data Frame Format
FIG.9 Data Bits Format
FIG.10 Data Packet Format
FIG.11 Waiting Time Table
| Priority | Basic Waiting Time (ms) | Random Waiting Time (ms) | Total Waiting Time (ms) |
|---|---|---|---|
| 1st Class Nodes | 1 | 0-1 | 1-2 |
| 2nd Class Nodes | 2 | 0-1 | 2-3 |
| 3rd Class Nodes | 3 | 0-1 | 3-4 |
| 4th Class Nodes | 4 | 0-1 | 4-5 |
| 5th Class Nodes | 5 | 0-1 | 5-6 |
| 6th Class Nodes | 6 | 0-1 | 6-7 |
| 7th Class Nodes | 7 | 0-1 | 7-8 |

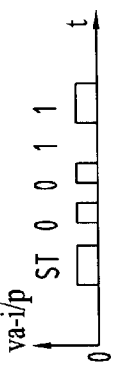
FIG.17A
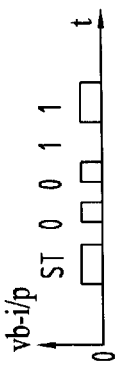
FIG.17B
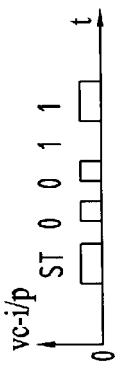
FIG.17C
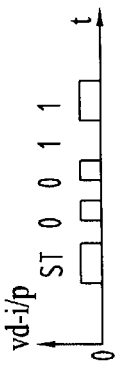
FIG.17D
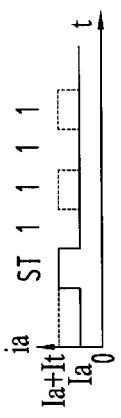
FIG.18A
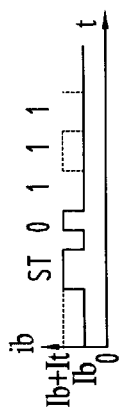
FIG.18B
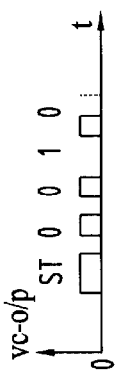
FIG.18C
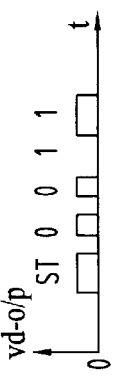
FIG.18D
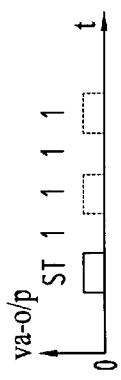
FIG.19A
FIG.19B
FIG.19C
FIG.19D $Io = Ia + Ib + Ic + Id$
$il$ - inductor source current $ip = i - il$
$ip$ - current flow across the clamp $vp$ - voltage across the clamp $v = Vo - vp$
$v$ - common bus voltage

MIXED MODE TRANSCEIVER DIGITAL CONTROL NETWORK AND COLLISION-FREE COMMUNICATION METHOD

This invention relates, in general, to the field of wired digital control network systems. In particular, this invention relates to a wired communication and control network system and a method for avoiding collision in the transmission of data in such a system.

BACKGROUND OF THE INVENTION

Home and building automation is an important area in the development of modern technology, of which the design of control systems is one of its crucial areas. Many proposals have been put forward in this field, e.g. "X-10", "Lonwork", "CEBus" and "EIB".

Home and building control systems are complicated and multi-faceted systems. Stand-alone or point-to-point products clearly cannot fulfill the various requirements which may arise in real life situation. A control network system is much more versatile and may therefore meet such requirements. The nodes in such a control network system can communicate with one another, share the same resources, and be assembled together by various means (e.g. switches, sensors, timers, telephones, computers, etc.) in the light of the needs, in order to realize various control functions, e.g. integrated control and monitoring of lighting, energy, access and security at home or office.

Centralized control system is a well-known technology. However, the application of such a technology in home and building automation has met with various problems, e.g. complicated wiring (due to the large number of wires required), difficulty in extending the system (as there is usually a fixed capacity for each central control system), space requirement (due to the need to accommodate the central unit usually in a separate room), and the rigorous requirements for reliability (e.g. the whole system will not function when there are problems with the central unit).

At present, there are many media access control (MAC) methods, e.g. token passing, polling, circuit switching, and time-division multiple access (TDMA), etc. However, to a control network, while the signals/data to be transmitted are usually relatively short, the response speed is required to be relatively high. Random access is thus one of the few methods which can meet the requirements of a real-time control.

In a random access system, it is possible that more than one node seek to transmit signals/data at the same time, resulting in a collision. Various methods have been devised to resolve such contentions, to recover from collisions, or to avoid collisions. Such methods include CSMA/CD (Carry Sense Multiple Access with Collision Detection) and CSMA/CA (Carry Sense Multiple Access with Collision Avoidance). However, irrespective of the method used, if two or more nodes transmit signals/data at the same time, all such attempted transmissions will fail. Each of these nodes has to stop transmitting for a respective period of time, and tries transmitting again. Such will cause a reduction of the communication efficiency.

Most current communication networks do not consider the issue of priority. If the data packets to be transmitted are not queued sequentially, each has to wait for the same pre-determined period of time before it is transmitted. This is a conventional method for, and does not cause much difficulty to, a communication system. However, the issue of priority becomes very important to a control system. The difference could be very significant since different nodes may carry out different functions within the system. In case of emergency, serious problems may arise if certain important signals/data cannot be transmitted by a particular node.

To a wired control network, it is desirable to keep the number of wires to a minimum. The more are the number of wires, the more inconvenient the wiring process will be, and the higher the risk of mis-wiring will also be. For example, even in a network in which there are only four wires (e.g. USB), there are 23 (i.e. (4!–1)) ways of mis-wiring.

While it is a common practice to provide a separate power source for each node in the network, it is desirable to provide electric power to the nodes through the network. Common link power systems generally adopt transformer coupling to separate power from signals in the bus/transmission medium. Because of the use of transformers, the system is usually of a relatively large size, and thus more expensive. In addition, due to the relatively low internal resistance of the transformer, the fanning-out capacity of the bus/transmission medium will be lowered when the transformer is connected to the network.

It is thus an object of the present invention to provide, a mixed mode transceiver digital control network system, a transceiver, a method of setting priority to each node, and a method for avoiding collision in such a system, in which the aforesaid shortcomings are mitigated, or at least to provide a useful alternative to the public.

SUMMARY OF THE INVENTION

According to a first aspect of the present invention, there is provided a digital data communication network system including a power supply means and at least two nodes, wherein said power supply means and said nodes are connected to one another via a transmission media whereby-digital signals/data are transmittable between said nodes, wherein said power supply means supplies electric power to said nodes, and wherein at least one of said nodes includes a current mode transmitter and at least one of said nodes includes a voltage mode receiver. This aspect of the invention has a number of independent sub-aspects. In one sub-aspect the system includes a pulse generating means through which electric current from said power supply means passes to induce a voltage pulse. In another sub-aspect the voltage mode receiver includes a capacitor and an inverter means.

According to a second aspect of the present invention, there is provided a digital data communication system for delivering digital signals from a current mode transmitter to a voltage mode receiver, said system including an electrically conductive cable coupling said transmitter and said receiver with each other, thereby providing a digital data communications path; DC power supply means for producing a pre-determined electric potential, said power supply means having a first voltage terminal and a second voltage terminal; current control means coupling said first voltage terminal of said power supply means to said cable for providing a first electric current path, said first electric current path operating as a low impedance path for DC current; voltage control means connected in parallel with said current control means for controlling the voltage amplitude across said current control means, and for providing a second electrical path for transient electric current; connecting means coupling said second voltage terminal of said power supply means to said cable to provide a power distribution path; wherein said current mode transmitter is coupled to said cable for implementing a current loop, wherein said transmitter produces current pulses in said current loop to perform a current mode digital data transmission; and wherein said voltage mode receiver is coupled to said cable for receiving voltage pulses on said cable produced by said voltage control means to perform a voltage mode digital data reception.

According to a third aspect of the present invention, there is provided a digital data communication network system for distributing power and for providing signal passing capabilities through a bus, said network including a plurality of nodes each including a mixed mode data bus transceiver for generating electric current pulses and receiving electric voltage pulses; an electrically conductive cable coupling said nodes with one another to provide a path for power delivery and data communications; a DC power supply means for producing a pre-determined electric potential, said power supply means having a first voltage terminal and a second voltage terminal; current control means coupling said first voltage terminal of said power supply means to said cable for providing a first DC current low impedance path; voltage control means connected in parallel with said current control means for controlling the voltage amplitude across said current control means and providing a second current path for transient current; and connection means coupling said second voltage terminal of said power supply means to said conductive cable to provide a power distribution path.

According to a fourth aspect of the present invention, there is provided a transceiver adapted to transmit and receive digital signals on a data bus which delivers direct current power and digital data simultaneously, said transceiver including a bridge rectifier having two connection terminals adapted to provide a non-polarity interface with said bus, said rectifier further including a + terminal and a − terminal; a current mode transmitter coupled to said + terminal and said − terminal of said rectifier for implementing a current loop adapted to produce electric current pulses to said data bus to perform current mode data transmission; a voltage mode receiver coupled to said + terminal and said − terminal of said rectifier, said receiver being adapted to receive electric voltage pulses on said data bus to perform voltage mode data reception; and a current coupling means coupled to said + terminal and said − terminal of said rectifier, said current coupling means being adapted to provide a regulated direct current supply to said transmitter and said receiver and other means in said transceiver.

According to a fifth aspect of the present invention, there is provided a method of communication in a mixed mode communication and control network system, wherein said system includes at least a first node, a second node, a power supply means, and current to voltage converter means connected with one another via a bus, comprising the steps of (a) generating at least a first electric pulse by said first node; (b) transmitting said first electric pulse to said power supply means in the form of an electric current; (c) causing a first electric current from said power supply means to pass through said current to voltage converter means to induce at least a second electric pulse; and (d) transmitting said second electric pulse into said bus.

According to a sixth aspect of the present invention, there is provided a method for medium access control in a mixed mode communication and control network system, wherein said system includes at least a first node and a second node each being adapted to transmit signals into a bus via which said nodes are connected with each other, including the steps of (a) establishing a plurality of priority levels each with a corresponding different range of waiting time; (b) assigning one of said plurality of priority levels to each of said nodes; (c) said first node generating a waiting time on the basis of the priority level assigned thereto; (d) said first node checking whether said bus is free for transmission; (e) said first node checking whether the said waiting time has expired; (f) repeating steps (d) and (e) until the waiting time has expired; and (g) commencing transmission of a first data packet by said first node if said bus is free for transmission.

According to a seventh aspect of the present invention, there is provided a method of transmitting data in a mixed mode communication and control network system, wherein said system includes at least a first node and a second node each being adapted to transmit pulses into a bus via which said nodes are connected with each other, including the steps of (a) said first node causing a pulse of a first polarity to be transmitted into said bus; (b) said first node checking whether a pulse of said first polarity appears on said bus; and (c) finishing sending said pulse of said first polarity into said bus for the full period of pulse time-width if a pulse of said first polarity is detected on said bus in step (b).

According to an eighth aspect of the present invention, there is provided a method of transmitting at least one data packet for providing a collision-free communications in a mixed-mode multi-drop random access digital control network, wherein said network includes at least a first node and a second node each being adapted to transmit and receive data packets through a bus via which said nodes are connected with each other and constituting a wired-AND logic, wherein said data packet includes at least a logic high and a logic low to be transmitted into said bus, said method including the steps of:
(a) when said first node seeks to transmit said logic low into said bus, said first node;
 (1) checks logic state from said bus;
 (2) starts to transmit said logic low into said bus if said bus presents logic high in step (1) above;
 (3) completes transmitting said logic low into said bus for the full period of the time-width of the said logic low; and
(b) when said first node seeks to transmit said logic high into said bus, said first node:
 (1) starts to transmit said logic high into said bus;
 (2) checks logic state from said bus;
 (3) checks whether a pre-determined waiting time is up; and
 (4) repeats steps (b)(2) and (b)(3) until said first node completes transmission of said logic high into said bus for the full period of the time-width of said logic high if said bus keep on presenting logic high in step (b)(2).

According to a ninth aspect of the present invention, there is provided a method of transmitting at least one data packet for providing a collision-free communications in a mixed-mode multi-drop random access digital control network, wherein said network includes at least a first node and a second node each being adapted to transmit and receive data packets through a bus via which said nodes are connected with each other and constituting a wired-OR logic, wherein said data packet includes at least a logic high and a logic low to be transmitted into said bus, said method including the steps of:
(a) when said first node seeks to transmit said logic high into said bus, said first node:
 (1) checks logic state from said bus;
 (2) starts to transmit said logic high into said bus if said bus presents logic low in step (1) above;
 (3) completes transmitting said logic high into said bus for the full period of the time-width of the said logic high; and (b) when said first node seeks to transmit said logic low into said bus, said first node:
(1) starts to transmit said logic low into said bus;
(2) checks logic state from said bus;
(3) checks whether a pre-determined waiting time is up; and
(4) repeats steps (b)(2) and (b)(3) until said first node completes transmission of said logic low into said bus for the full period of the time-width of said logic low if said bus keep on presenting logic low in step (b)(2).

According to a tenth aspect of the present invention, there is provided a transceiver adapted to transmit and receive digital signals/data via a mixed mode bus which delivers direct current power and digital data simultaneously, said transceiver including current mode transmitter means for implementing a current loop adapted to produce electric current pulses to said bus to perform a current mode data transmission, and voltage mode receiver means for receiving electric voltage pulses on said bus to perform voltage mode data reception. This aspect of the invention has a number of independent sub-aspects. In one sub-aspect the transceiver includes bridge rectifier means for providing a polarity insensitive interface with said bus. In another sub-aspect the transceiver includes current coupling means for providing a regulated direct current source. In yet another sub-aspect the receiver means includes an input capacitor and an inverter means.

BRIEF DESCRIPTION OF THE DRAWINGS

Preferred embodiments of the invention will now be described by way of examples, and with reference to the accompanying drawings, in which:

FIG. 8 shows the data frame format used in the system according to the present invention;

FIG. 9 shows the data bits format used in the system according to the present invention;

FIG. 10 shows the data packet format used in the system according to the present invention;

FIG. 11 is a table showing the respective waiting time of the priority levels;

FIGS. 17A to 17D show the respective waveform of the voltage at the output of the micro-controller of the four nodes in FIG. 16;

FIGS. 18A to 18D show the respective waveform of the sink current $i_a$, $i_b$, $i_c$, and $i_d$ of the four nodes in FIG. 16;

FIGS. 19A to 19D show the respective waveform of the voltage at the input of the micro-controller of the four nodes in FIG. 16;

DETAILED DESCRIPTION OF THE PREFERRED EMBODIMENTS

Figure 1:
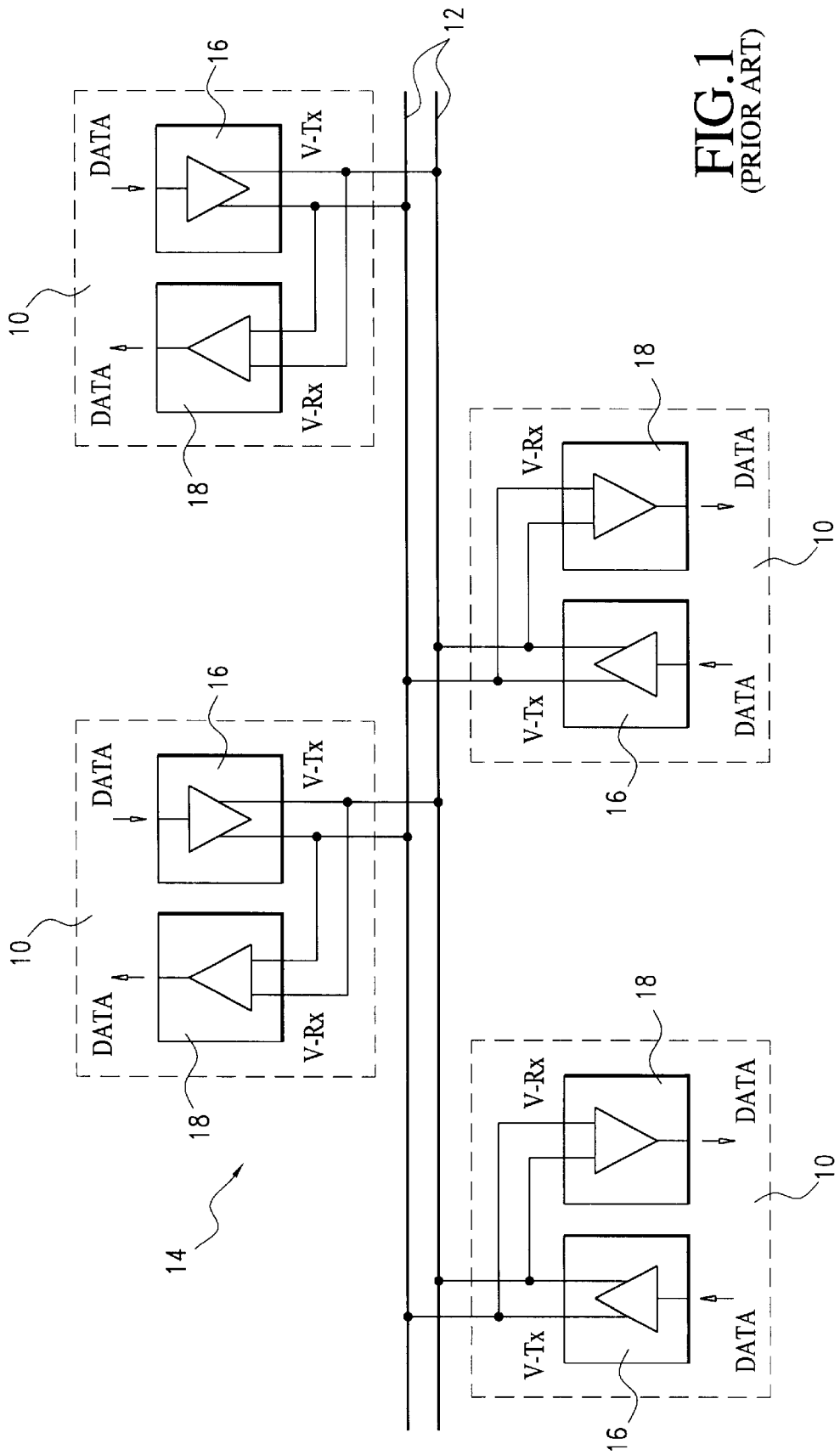
FIG. 1 is a schematic diagram of a conventional voltage mode multi-drop network system.

At present, the most common network system is "voltage mode network". A schematic diagram of such a system is shown in FIG. 1. As can be seen in FIG. 1, a number of nodes/transceivers 10 (four as shown in FIG. 1) are connected to a bus 12 to form a voltage mode network 14. In each of the nodes/transceivers 10 is a voltage mode transmitter 16, and a voltage mode receiver 18. The transceivers 10 (e.g. EIA-485) of such a system 14 operate by means of electric voltage. The digital signals/data transmitted through the transmission media (i.e. the bus 12) are in the form of different levels (high or low) of electric voltage. If a medium of a smaller nominal capacitance is chosen, and is used in conjunction with a receiver of a higher input impedance, the system will usually be of a higher fanning-out capacity. For example, an EIA-485 transceiver usually has a fanning-out capacity of 32. However, a smaller capacitance and a higher impedance will reduce the anti-interference capacity of the system. As a result, a voltage mode network, as compared with a current mode network (to be discussed below), is more easily interfered by outside electromagnetic field.

Figure 2:
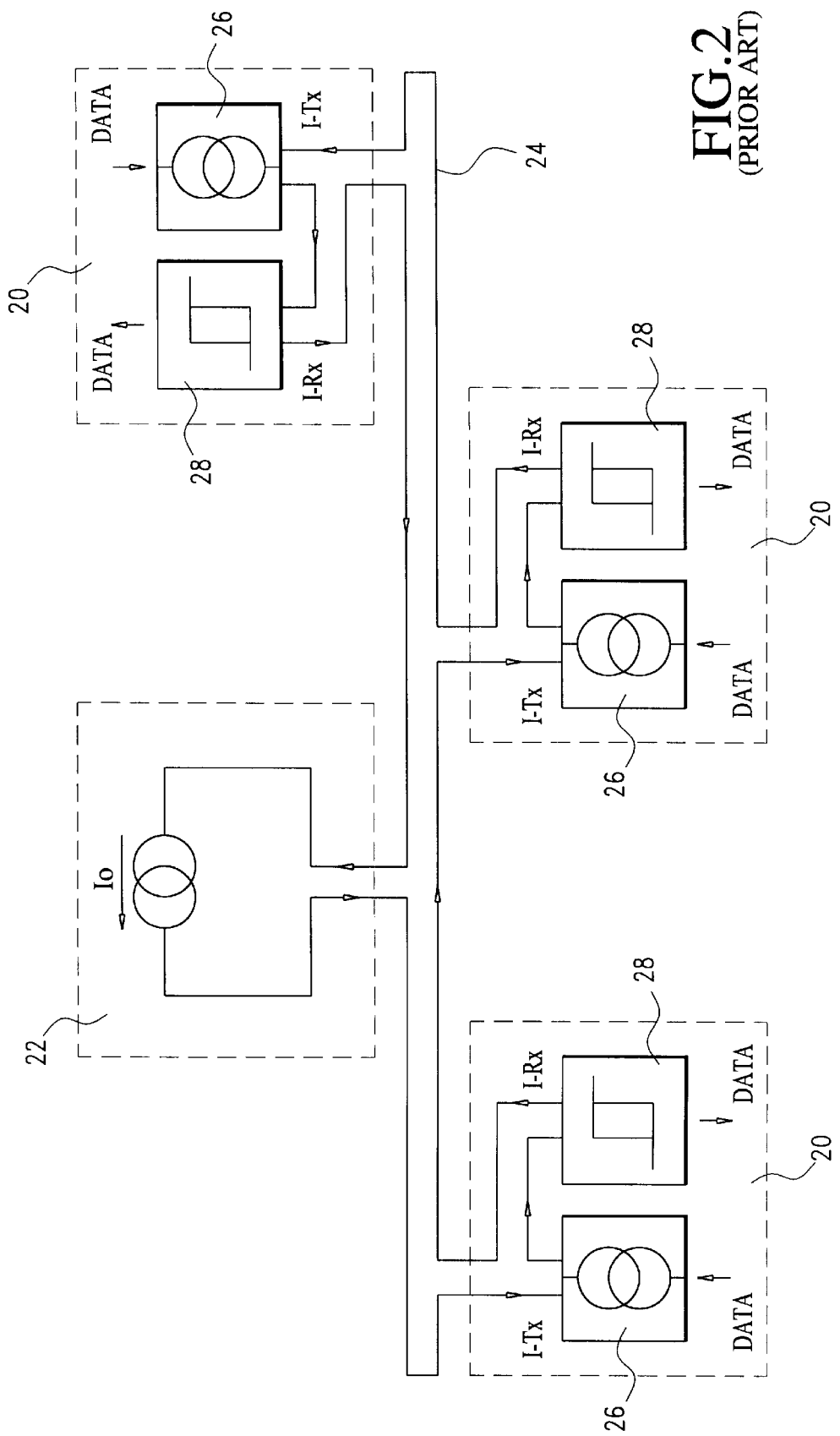
FIG. 2 is a schematic diagram of a conventional current mode multi-drop network system.

As to a "current mode network", such usually refers to a current mode/loop multi-drop system, a schematic diagram of which is shown in FIG. 2. As shown in FIG. 2, three nodes/current mode transceivers 20 are connected with a current source 22 to form a system, via a closed-loop bus 24. Each of the transceivers 20 includes a current mode transmitter 26 and a current mode receiver 28. In such a system, the transmitter (e.g. HCPL-4100 of Hewlettt Packard) and receiver (e.g. HCPL-4200 of Hewlett Packard) operate by means of electric current. The digital signals/data transmitted in the transmission media are in the form of electric current of different magnitude (Mark/Space). As the receiver of a current mode system has a low input impedance, such a system usually has a higher anti-interference capacity. However, as all the transceivers in such a network have to be linked up to form a closed loop, such will reduce the reliability of the system. In particular, if there is an open circuit at any point, the whole system will break down. The fanning-out capacity of such a transceiver is also smaller. For example, a current mode system can usually consist of several transceivers. Such a system is therefore only suitable for use in a simple yet high-interference setting.

Figure 3:
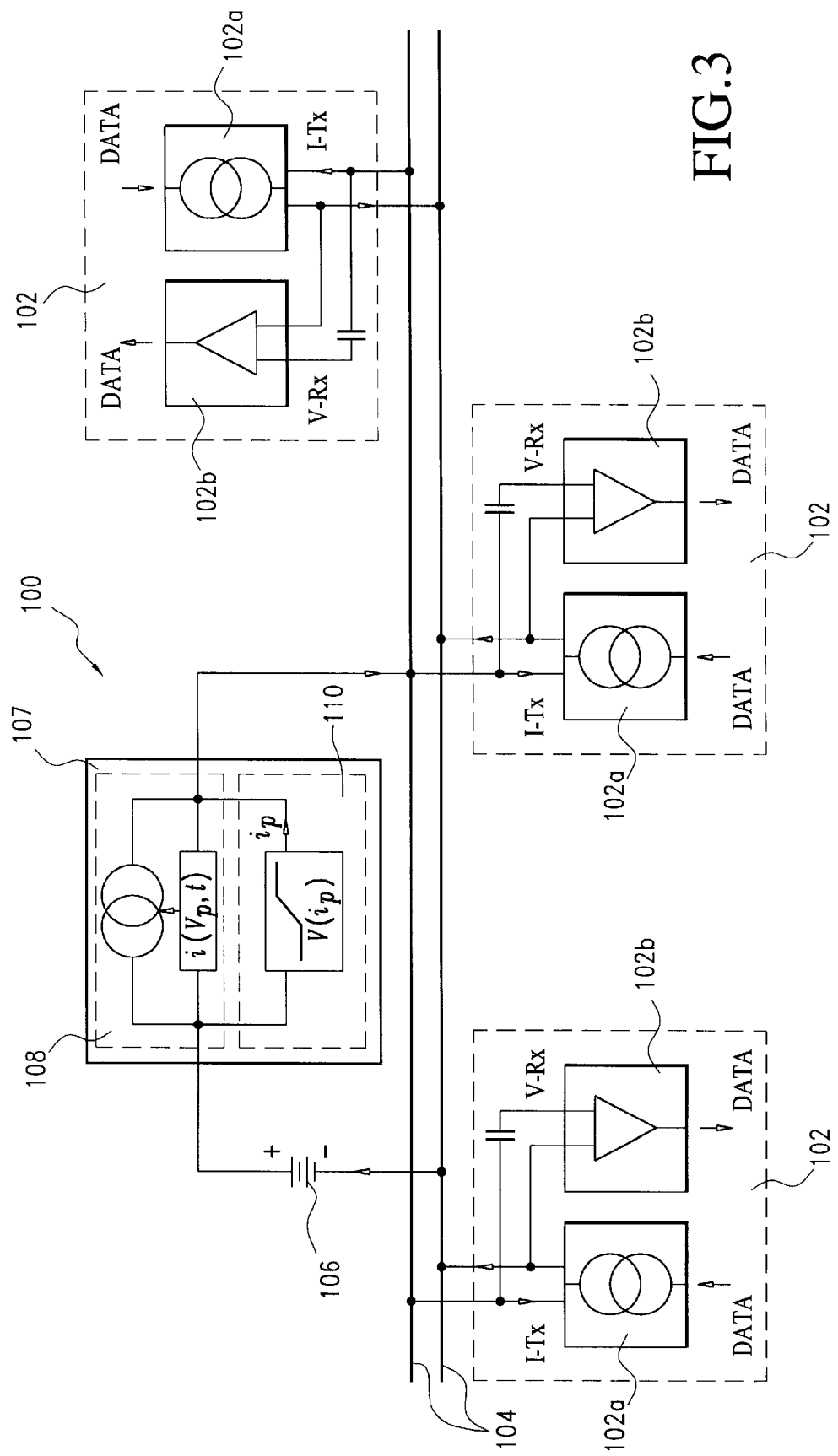
FIG. 3 is a schematic diagram of a first mixed mode multi-drop network system according to the present invention.

A mixed mode multi-drop network system 100 according to the present invention is shown schematically in FIG. 3. As can be seen, three nodes/mixed mode transceivers 102 are connected with one another to form the system 100 via a bus 104 in the form of a single unshielded twisted pair (UTP) wire. Each node 102 includes a current mode transmitter 102a and a voltage mode receiver 102b. The transmitter 102a of the respective nodes 102 transmits signals/data via the bus 104 to other node(s) 102, and the receiver 102b of the respective nodes 102 receives signals/data from other node(s) 102 via the bus 104. It should be noted that the digital signals/data transmitted by the transmitters 102a are in the form of electric current of different magnitude (Mark/ Space). On the other hand, the digital signals/data received by the receivers 102b are in the form of different (high or low) levels of electric voltage.

Also connected with the nodes 102 via the bus 104 is a DC power supply 106 and a converter 107, which acts as a pulse generator. The converter 107 includes a current controller 108 which provides an electric current $i(v_p, t)$ to the system, in which the magnitude of the electric current $i(v_p, t)$ varies as a function of the electric voltage $v_p$ across the current controller 108 and the length of time t during which the electric current flows through the current controller 108. Connected in parallel with the current controller 108 is a voltage controller (also called a current to voltage converter) 110. This voltage controller 110 ensures that the electric current from different transmitters 102a will be converted into the same electric voltage for transmission into the bus 104. Another function of the voltage controller 110 is to ensure that, when more than one transmitter 102a are transmitting simultaneously, the electrical pulse level in the bus 104 will not exceed a pre-determined range, e.g. 1.5V–3V.

Figure 4:
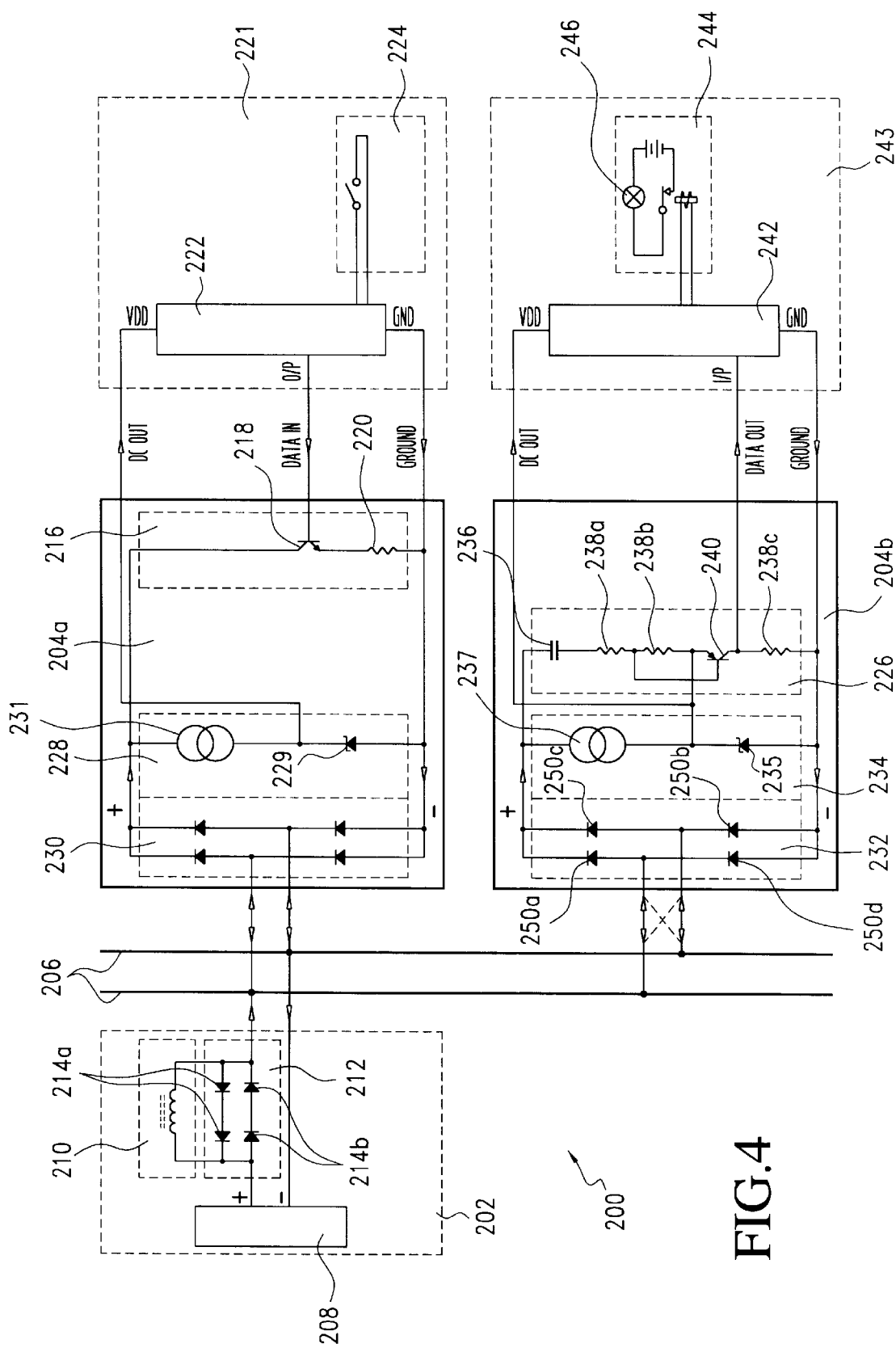
FIG. 4 is a schematic block diagram of a first embodiment of an application system according to the present invention.

A first embodiment of an application system according to the present invention is shown schematically in FIG. 4. This system 200 includes a network power supply 202 electrically connected to two nodes 204a, 204b. The network power supply 202 is electrically connected with the nodes 204a, 204b via a bus 206 (in the form of a single unshielded twisted pair (UTP) wire).

The network power supply 202 includes a DC power source 208, and a converter (which acts as a pulse generator) comprising a current controller in the form of a cored inductor 210 and a voltage controller/current to voltage converter in the form of a bi-directional voltage clamp 212. In this example, the voltage clamp 212 includes two pairs of diodes 214a, 214b arranged in parallel but opposite directions. The output from the DC power source 208 passes through the inductor 210 before it is transmitted to the bus 206.

The node 204a includes a current mode transmitter 216 (including a transistor 218 and a resistor 220), a current coupling circuit 228 and a bridge rectifier 230. The current coupling circuit 228 directly couples the DC current in the bus 206 while not affecting the digital signals in the bus 206. The node 204a is also connected to an application module 221 including a micro-controller or processor 222 connected to a sensor 224. In this embodiment, the sensor 224 is in the form of a switch. The transistor 218 is connected to the output port (O/P) of the micro-controller or processor 222 (e.g. INTEL 80C51 series), which controls the operation of the current mode transmitter 216. The current coupling circuit 228 includes a zener diode 229 for providing a regulated and stable direct power source to the node 204a. The $V_{DD}$ of the micro-controller or processor 222 is also connected to the current coupling circuit 228 whereby the micro-controller or processor 222 is also powered by the same DC power source 208 of the system.

As to the node 204b, such includes a voltage mode receiver 226, a current coupling circuit 234 and a bridge rectifier 232. As in the case of the current coupling circuit 228 in the node 204a, the current coupling circuit 234 in the node 204b directly couples the DC current in the bus 206 while not affecting the digital signals in the bus 206. As to the voltage mode receiver 226, such includes a capacitor 236 and an inverter circuit (including resistors 238a, 238b, 238c and a transistor 240). The transistor 240 is connected to the input port (I/P) of a micro-controller or processor 242 of an application module 243 for inputting the electric pulses received from the bus 206 into the micro-controller or processor 242. Upon receipt of such electric pulses, the micro-controller or processor 242 may then, according to a pre-determined procedure, give out a signal to a control module 244 to perform certain control functions. In this embodiment, the control module 244 includes a light bulb 246 which will be turned on when certain pre-determined electric pulses are received by the micro-controller or processor 242. The current coupling circuit 234 includes a zener diode 235 for providing a regulated and stable direct power source to the receiver 226. The $V_{DD}$ of the micro-controller or processor 242 is also connected to the current coupling circuit 234 whereby the micro-controller or processor 242 is also powered by the same DC power source 208 of the system.

It can be seen that a complete communication and control process can be performed by the system 200 in which when the switch constituting the sensor 224 in the application module 221 is closed, electric pulses are caused by the current mode transmitter 216 to be transmitted into the bus 206. Such electric pulses are received by the voltage mode receiver 226 of the node 204b and inputted into the micro-controller or processor 242 to output a signal, which is in the form of the lighting up of the bulb 246 in the present embodiment. Electric power is also delivered from the DC power source 208 to the various nodes 204a, 204b and application modules 221, 243 of the system 200. In particular, it can be seen that no transformer is required in this system.

It can also be seen that, because of the existence of the bridge rectifiers 230, 232 in the respective nodes 204a, 204b, no mis-wiring will occur in the system 200. Take the node 204b as an example. According to the present connection, the electric current from the DC power source 208 will flow (in the convention manner) into the node 204b via diode 250a, and return via diode 250b. Even if a "mis-wiring" occurs (as shown by the dotted lines in FIG. 4), the electric current from the DC power source 208 will flow into the node 204b via diode 250c, and returns via diode 250d. Such therefore ensures that the direction of the flow of the electric current in the node 204b and the application module 243 is the same irrespective of the way in which the wires of the node 204b are connected to the bus 206.

It can also be seen that, as shown in FIG. 4, the bridge rectifier 230 include two terminals coupled to the bus 206 for providing a non-polarity interface with the bus 206, in which the bridge rectifier 230 includes a + terminal and a − terminal. The current coupling circuit 228 includes a constant current source 231 with two terminals, one of which being connected to the + terminal of the bridge rectifier 230. Another end of the constant current source 231 is connected to the − terminal of the bridge rectifier 230 via the zener diode 229. By way of such an arrangement, electric power is supplied to the application module 221.

The transmitter 216 also includes the transistor 218, which includes a collector coupled to the + terminal of the bridge rectifier 230, a base for transmitting data to be transmitted into the transistor 218, and an emitter. The resistor 220 is coupled at one end to the emitter of the transistor 218 and at another end to the − terminal of the bridge rectifier 230, so as to implement a transmission output current loop.

The bridge rectifier 232 includes two terminals coupled to the bus 206 for providing a non-polarity interface with the bus 206, in which the bridge rectifier 232 includes a + terminal and a − terminal. The current coupling circuit 234 includes a constant current source 237 with two terminals, one of which being connected to the + terminal of the bridge rectifier 232. Another end of the constant current source 237 is connected to the − terminal of the bridge rectifier 232 via the zener diode 235. By way of such an arrangement, electric power is supplied to the receiver 226. The receiver 226 includes the capacitor 236 coupled to the + terminal of the bridge rectifier 232 for isolating the direct current potential on the + terminal of the bridge rectifier 232.

Figure 5:
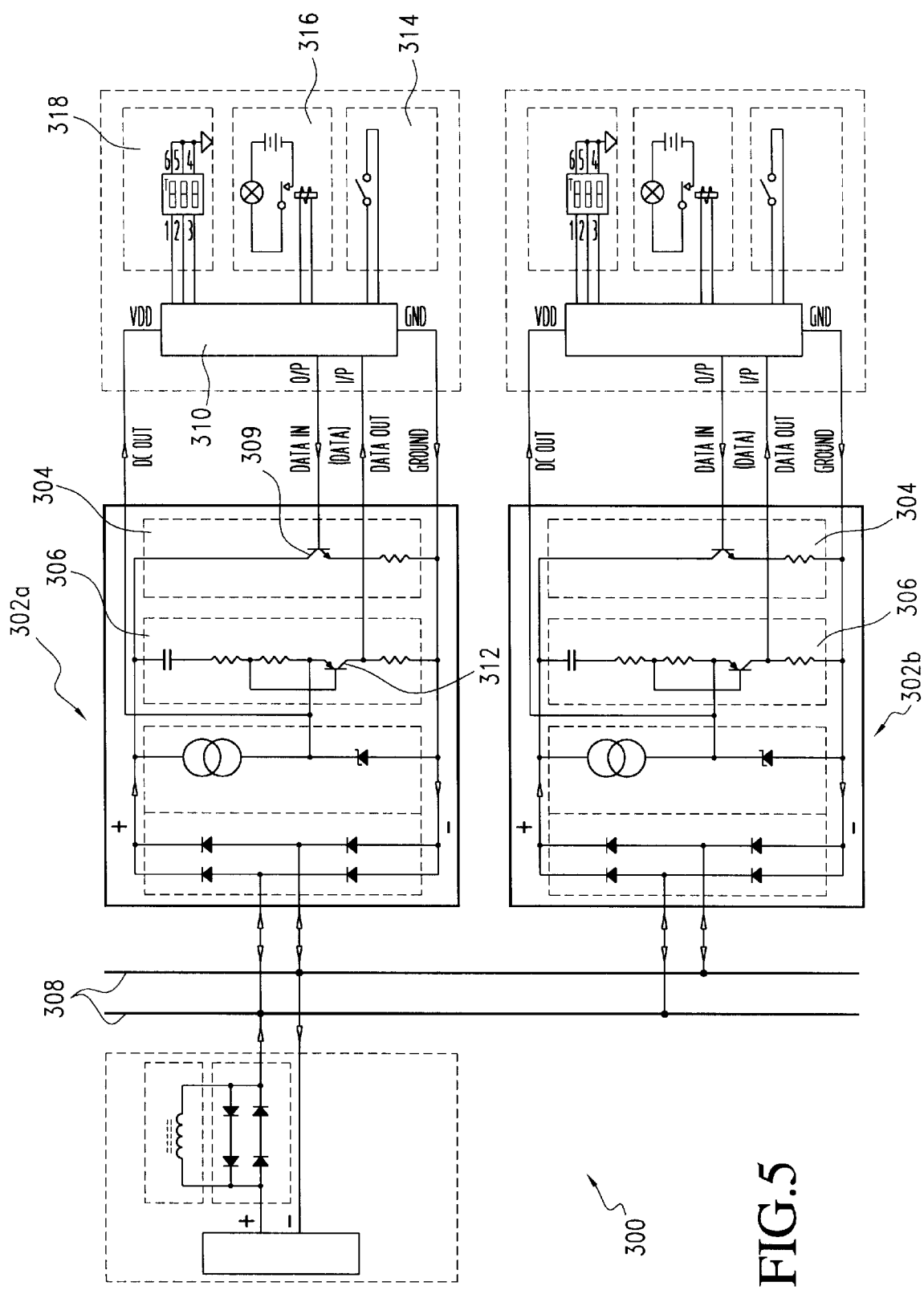
FIG. 5 is a schematic block diagram of a second embodiment of an application system according to the present invention.

A second embodiment of an application system according to the present invention is shown schematically in FIG. 5. This system 300 is very similar to the system 200 shown in FIG. 4. One of the major differences is that both nodes 302a, 302b include a current mode transmitter 304 and a voltage mode receiver 306, so that each of the nodes 302a, 302b is a transceiver capable of both transmitting signals and receiving signals via a bus 308. Inter-communication is therefore possible between these two nodes 302a, 302b. As the structure of both nodes 302a, 302b and their connection with the rest of the system 300 are the same, we shall only discuss the node 302a in more detail.

As shown in FIG. 5, a transistor 309 of the current mode transmitter 304 is connected to the output port (O/P) of a micro-controller or processor 310, while the input port (I/P) of the micro-controller or processor 310 is connected to a transistor 312 of the voltage mode receiver 306. By way of such an arrangement, the micro-controller or processor 310 can control the transmission of signals/data into the bus 308 via the current mode transmitter 304, and can receive signals/data from the bus 308 via the voltage mode receiver 306. The micro-controller or processor 310 is also connected to a sensor 314 and a control module 316, the operation and functions of which are as discussed above. A two-way digital data network system for sensing, communication and control is thus realized. The micro-controller or processor 310 is also connected to a priority setting module 318, the function of which will be discussed below.

Figure 6:
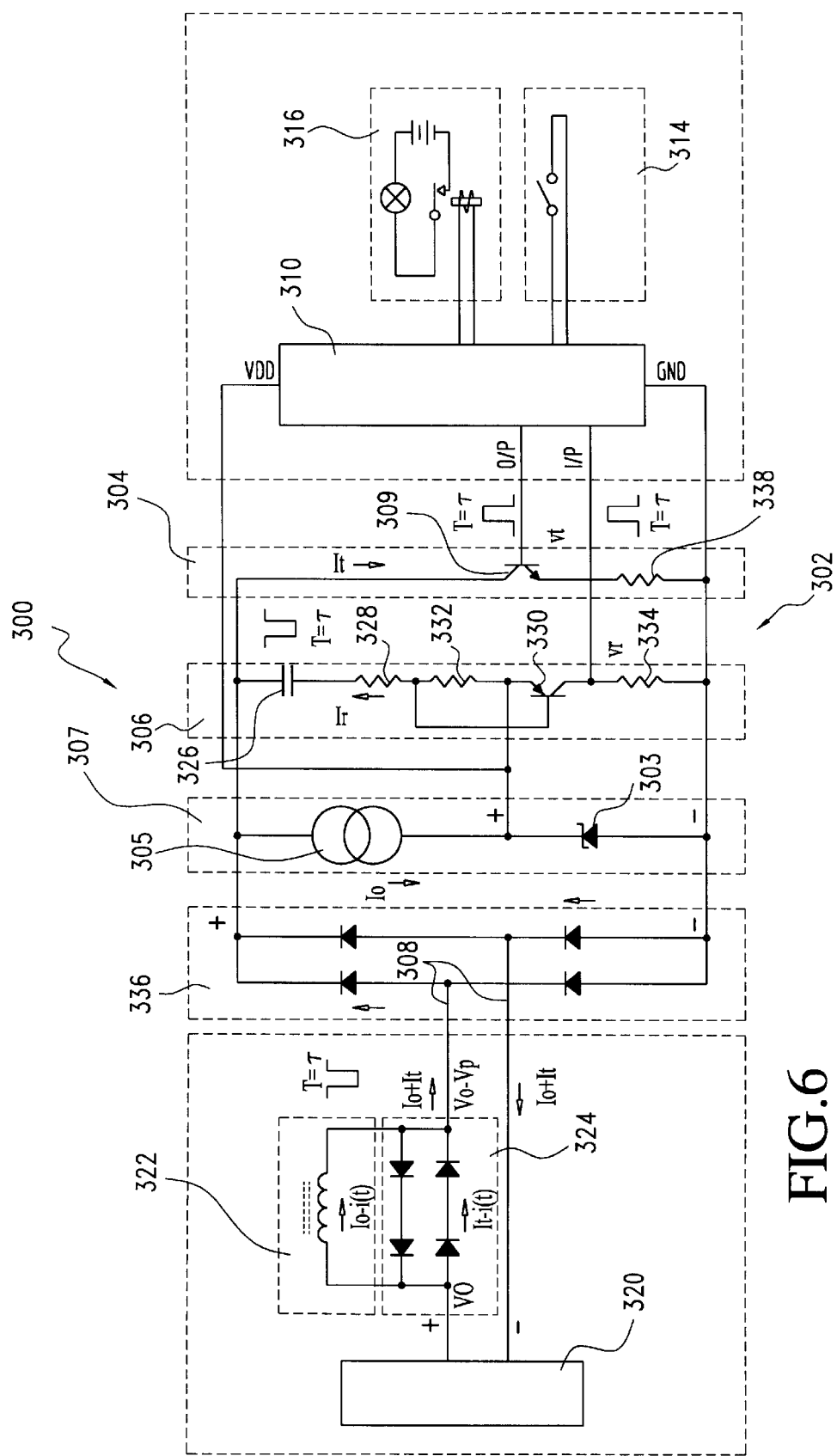
FIG. 6 shows the current flow and the voltage change at certain points of the system when a negative pulse is transmitted into the bus and received by a receiver in the embodiment shown in FIG. 5.

FIG. 6 shows the current flow and the voltage change at certain points in the system 300 when a negative pulse is transmitted into the bus 308 and received by a receiver. Before proceeding with this analysis, we first consider the idle situation in which no node is transmitting any data/signals into the bus 308. In this situation, the transistor 309 in the current mode transmitter 304 of the node is cut off. The transmitter voltage ($v_t$) and the voltage at the O/P of the micro-controller or processor 310 is low. The receiver voltage ($V_r$) and the voltage at the I/P of the micro-controller or processor 310 is also low. The bus voltage is $V_0$, and the bus idle current is $I_0$.

When the sensor 314 is actioned upon (e.g. a switch is closed), the micro-controller or processor 310 of the node 302 senses this state and outputs one or more pre-determined data packets with a series of positive and negative pulses. If a negative electric pulse of a time-width T of τ is to be transmitted into the bus 308, the micro-controller or processor 310 will output a positive pulse of a time-width T of τ. When this electric pulse is received by the transistor 309 of the transmitter 304, the transistor 309 starts to conduct and a sink current of $I_t$ is induced and transmitted towards a DC power supply source 320 via the bus 308. As this system constitutes a closed current loop, the electric current flowing therein would increase instantly from $I_0$ to $I_0+I_t$. (In fact $I_0$ should increase instantly to $I_0+I_t-I_r$. However, since $I_r$ is negligible, such is not taken into account here.) An electric current of $I_0+i(t)$ will then flow through a cored inductor 322, while an electric current of $I_t-i(t)$ will flow through a bi-directional voltage clamp 324 in the same direction as the current $I_0+i(t)$. It can be seen that the combined electric current flowing away from the inductor 322 and the bi-directional voltage clamp 324 is $I_0+I_t$. The component $i(t)$ in both of these electric currents varies in accordance with the time during which the current $I_0+i(t)$ passes through the inductor 322, namely, from t=0 to t=τ. As the inductor 322 acts as a current controller which prevents the sudden increase of the flow of electric current through it, during the time between t=0 and t=τ, $I_0+i(t)$ is smaller than $I_0+I_t$, so that the DC power supply 320 has to pass an additional electric current of $I_t-i(t)$ through the bi-directional voltage clamp 324, which also acts as a voltage controller/current to voltage converter, in order to fulfill the current requirements of $I_0+I_t$ of the current loop of the system 300. Since an electric current flows through the bi-directional voltage clamp 324 in the same direction as the current flowing through the inductor 322, a negative electric pulse (i.e. negative with reference to $V_0$) of a time-width T of τ is induced, which negative electric pulse is then transmitted into the bus 308 to be received by other nodes of the same system.

When a negative electric pulse of a time-width T of τ is received by the voltage mode receiver 306 of the node 302, a capacitor 326 couples the negative electric pulse to a resistor 328, thus drawing a negligible electric current $I_r$ which is less than one-thousandth of the current $I_t$. This causes a transistor 330 to conduct and transmit a positive electric pulse of a time-width T of τ to the micro-controller or processor 310. In this respect, the resistor 328, a resistor 332, the transistor 330 and a resistor 334 combine to act as an inverter whereby the negative electric pulse of the time-width T of τ is inverted to a positive electric pulse of a time-width T of τ. This positive electric pulse is then inputted into the micro-controller or processor 310 via its input port (I/P), thus completing a signal transmission and reception process.

Figure 7:
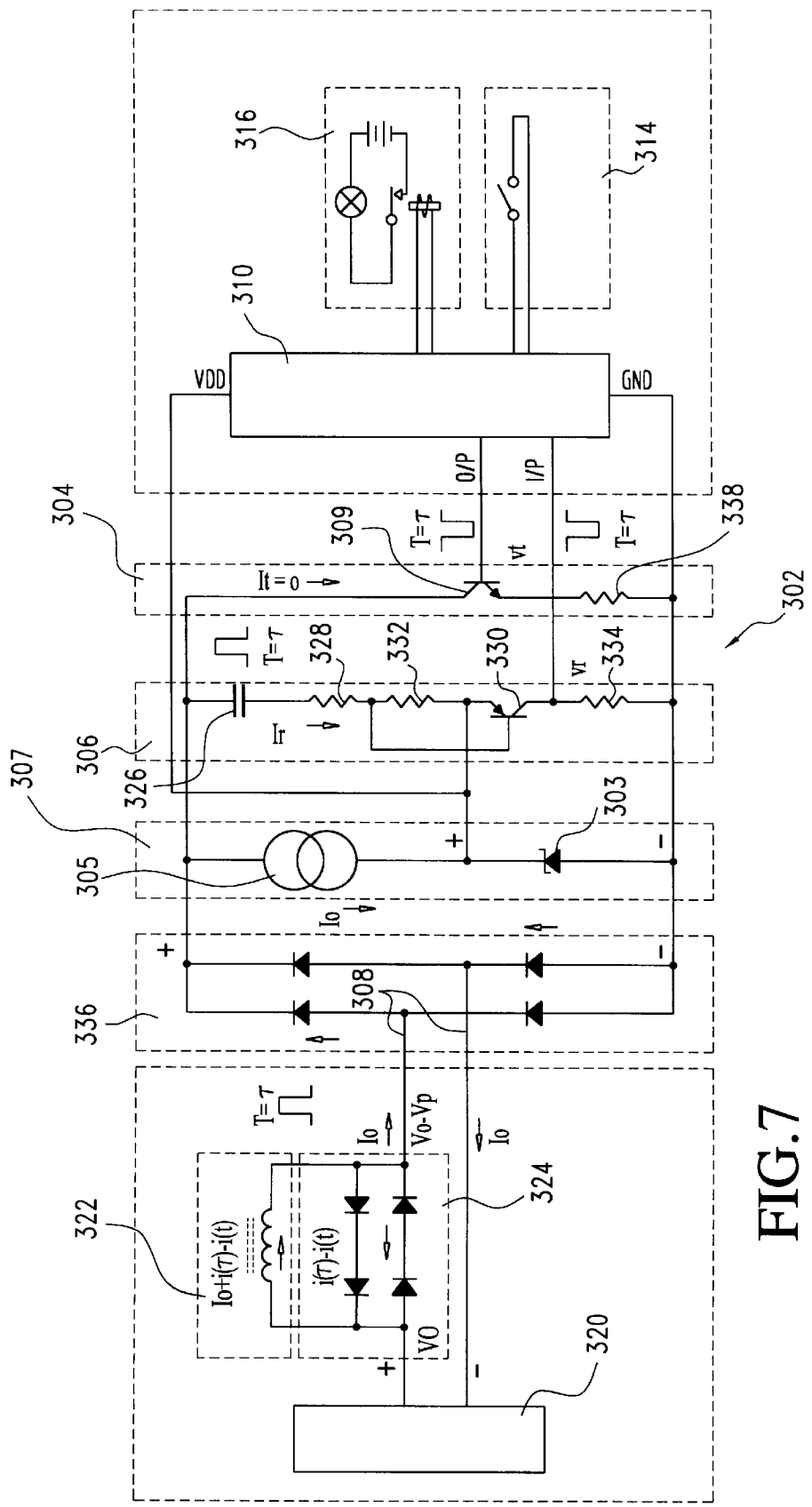
FIG. 7 shows the current flow and the voltage change at certain points of the sytem when a positive pulse is transmitted into the bus and received by a receiver, after a negative pulse has just been transmitted into the bus in the embodiment shown in FIG. 5.

Referring to FIG. 7, when a positive electric pulse of a time-width T of τ is to be transmitted into the bus 308 after a negative electric pulse of a time-width T of τ has just been transmitted into the bus 308 (as shown in FIG. 6 above), the transistor 309 does not conduct in this instance, so that the current $I_t$ is cut off and drops to 0A. The current passing through the node and the DC power source 320 will drop instantly from $I_0+I_t$ to $I_0$ (ignoring the negligible $I_r$). On the other hand, at the time of the cut off of $I_t$, the current flowing through the inductor 322 is $I_0+i(\tau)$. As the current passing through the inductor 322 cannot change instantly, the surplus current of i(τ) will flow through the bi-directional clamp 324 in a direction opposite to that of the current passing through the inductor 322, thus generating a positive pulse (i.e. positive with reference to $V_0$) on the bus 308. The positive pulse so generated causes the current passing through the inductor 322 to decrease in the manner of $I_0+i(τ)-i(t)$, from t=0 (when the cut off occurs) until t=τ, when the current passing through the inductor 322 will fall to $I_0$. In this connection, t is the time during which the current $I_0+i(τ)-i(t)$ passes through the inductor 322, namely, from t=0 to t=τ. The current passing through the bi-directional voltage clamp 324 will also decrease in the manner of i(τ)-i(t). When t=τ, no electric current will pass through the bi-directional voltage clamp 324. In any event, from t=0 to t=τ, the total electric current flowing out of the inductor 322 and the bi-directional clamp 324 will be $I_0$. Due to the passing of the electric current i(τ)-i(t) through the bi-directional clamp 324 in a direction opposite to the flow of the current $I_0+i(τ)-i(t)$ through the inductor 322, a positive electric pulse of a time-width T of τ is induced and transmitted into the bus 308.

When a positive pulse of a time-width T of τ is received by the node 302, such is coupled by the capacitor 326 to the resistor 328. The resistors 328, 332, 334 and the transistor 330 combine to act as an inverter to invert the positive pulse to a negative pulse of equal time-width, which is then inputted into the micro-controller or processor 310 via its input port (I/P), thus completing the transmission and reception of a signal.

In FIGS. 6 and 7, while it appears that the node 302 seems to transmit the electric pulse back to itself, such is only a simplified way of showing a complete course of transmission and reception of electric pulses. In an actual system, a first node may only include a current mode transmitter, while a second node may only include a voltage mode receiver, so that an electric pulse can only be transmitted from the first node and received by the second node (as shown in FIG. 4 herein). Preferably, as shown in FIG. 5, the system may include a number of nodes each including a current mode transmitter and a voltage mode receiver, so that each node acts as a transceiver whereby electric pulses may be transmitted and received among the nodes/transceivers.

As can also be seen, the node 302 includes a bridge rectifier 336 with two terminals for providing a non-polarity interface with the bus 308. The bridge rectifier further includes a + terminal and a − terminal. The current mode transmitter 304 is coupled to the + terminal and the − terminal of the bridge rectifier 336 for implementing a current loop for producing electric current pulses to the bus 308 to perform a current mode data transmission. The voltage mode receiver 306 is also coupled to the + terminal and the − terminal of the bridge rectifier 336 for receiving voltage pulses on the bus 308 to perform a voltage mode data reception. The node 302 also includes a current coupling circuit 307 (including a constant current source 305 and a zener diode 303) which is also coupled to the + terminal and the − terminal of the bridge rectifier 336 for providing a regulated direct current supply to the node 302.

The current mode transmitter 304 includes the transistor 309 with its collector coupled to the + terminal of the bridge rectifier 336, its base for inputting data to be transmitted to the transistor 309, and its emitter coupled to the − terminal of the bridge rectifier 336 via a resistor 338. The voltage mode receiver 306 includes the transistor 330 with a base and a collector coupled to the − terminal of the bridge rectifier 336 through the resistor 334 for outputting the data received from the bus 308. The receiver 306 also includes the capacitor 326 which couples the base of the transistor 330 with the + terminal of the bridge rectifier 336 through the resistor 328 for providing an AC path to the bus 308.

The current coupling circuit 307 includes the constant current source 305 with two terminals, one of which being coupled to the + terminal of the bridge rectifier 336 for sourcing a constant current. Another terminal of the constant current source 305 is coupled to the − terminal of the bridge rectifier 336 via the zener diode 303 for providing a regulated DC voltage source.

In a preferred embodiment of the above system, the working voltage of the zener diode 303 is about 5 volts, the potential of the DC power supply source 320 is approximately 24 volts, and the range of frequency of the current and voltage pulses in the node 302 is 5–50 kHz.

While only the transmission and reception of a single negative/positive electric pulse is described above, it should of course be understood that, in the actual situation, data are transmitted and received in the form of data packets, each containing a number of positive and negative signals. In the preferred embodiment according to the present invention, a positive pulse can only follow a negative pulse. For this reason, each byte commences with a negative start bit (to be discussed below).

For the purpose of the following discussion, it should be understood that a negative pulse on the bus/transmission medium is defined as a logic low state, while a positive pulse on the bus/transmission medium is defined as a logic high state. Put another way, if a logic low is to be transmitted, a negative pulse has to be transmitted to the bus. If a logic high is to be transmitted, then a positive pulse has to be transmitted to the bus.

In accordance with the present invention, it is possible to assign different priority levels to different nodes in the system, so that the node to which a higher priority is assigned has a higher chance of transmitting its data/signals into the bus. Referring first to FIG. 8, such shows the preferred data frame format used in this system. This is a "Manchester-like" data coding in which a pulse of a predetermined time duration of T represents a data bit "1" (irrespective of whether it is a positive pulse or a negative pulse), while two opposite pulses each of a time duration of T/2 combine to represent a data bit "0" (irrespective of whether the first pulse is negative or positive). Each byte includes eight data bits, a parity bit and a stop bit (of a time duration of T). In the preferred embodiment of the present system, and as shown in FIG. 9, the time duration T is 100 μs, and T/2 is thus 50 μs, so that the data transfer rate is 10,000 bits per second.

Turning to FIG. 10, such shows the data packet format adopted in the present system. It can be seen that each data packet is separated from the following one by a waiting/idle time (to be discussed below) and a start bit of the following data packet.

As mentioned above, the nodes in the present system can be assigned one of a plurality of priority levels. Such is usually carried out when the system is set up via the priority setting module 318 (see FIG. 5) of each node. For an example, and as shown in FIG. 11, seven priority levels (from the $1^{st}$ to the $7^{th}$) are set up. Each priority level corresponds to a range of waiting/idle time separating the transmission of data packets by the node to which the priority level is assigned. In the preferred embodiment according to FIG. 11, the total waiting time (in ms) equals to the sum of the basic waiting time (in ms) which is specific to each particular priority level (1$^{st}$ to 7$^{th}$) and a random waiting time (in ms) within the range of 0–1 ms.

For data packets transmitted by a node to which a 1$^{st}$ class priority level is assigned, the basic waiting time is the shortest, namely 1 ms. A random waiting time (between 0 ms to 1 ms) is then generated by the micro-controller or processor of the particular node. The actual total waiting time is thus between 1–2 ms. For data packets transmitted by a node to which a 7$^{th}$ class priority level is assigned, the waiting time is the longest, namely 7 ms. Again, a random waiting time between 0 ms to 1 ms is then generated by the micro-controller of the particular node. The actual total waiting time is thus between 7–8 ms. As a node will only attempt to transmit data packets when the bus is checked to be available for transmission (to be discussed below), the node to which a 1$^{st}$ class priority level is assigned will have a much higher chance of transmitting its data packets than the node to which a 7$^{th}$ class priority level is assigned.

Although only seven priority levels are assigned in this example, a different number of priority levels can in fact be set up. In addition, more than one node may be assigned the same priority level. For example, in a certain system, two nodes may be assigned a 1$^{st}$ class priority level, and three nodes may be assigned a 3$^{rd}$ class priority level.

Figure 12:
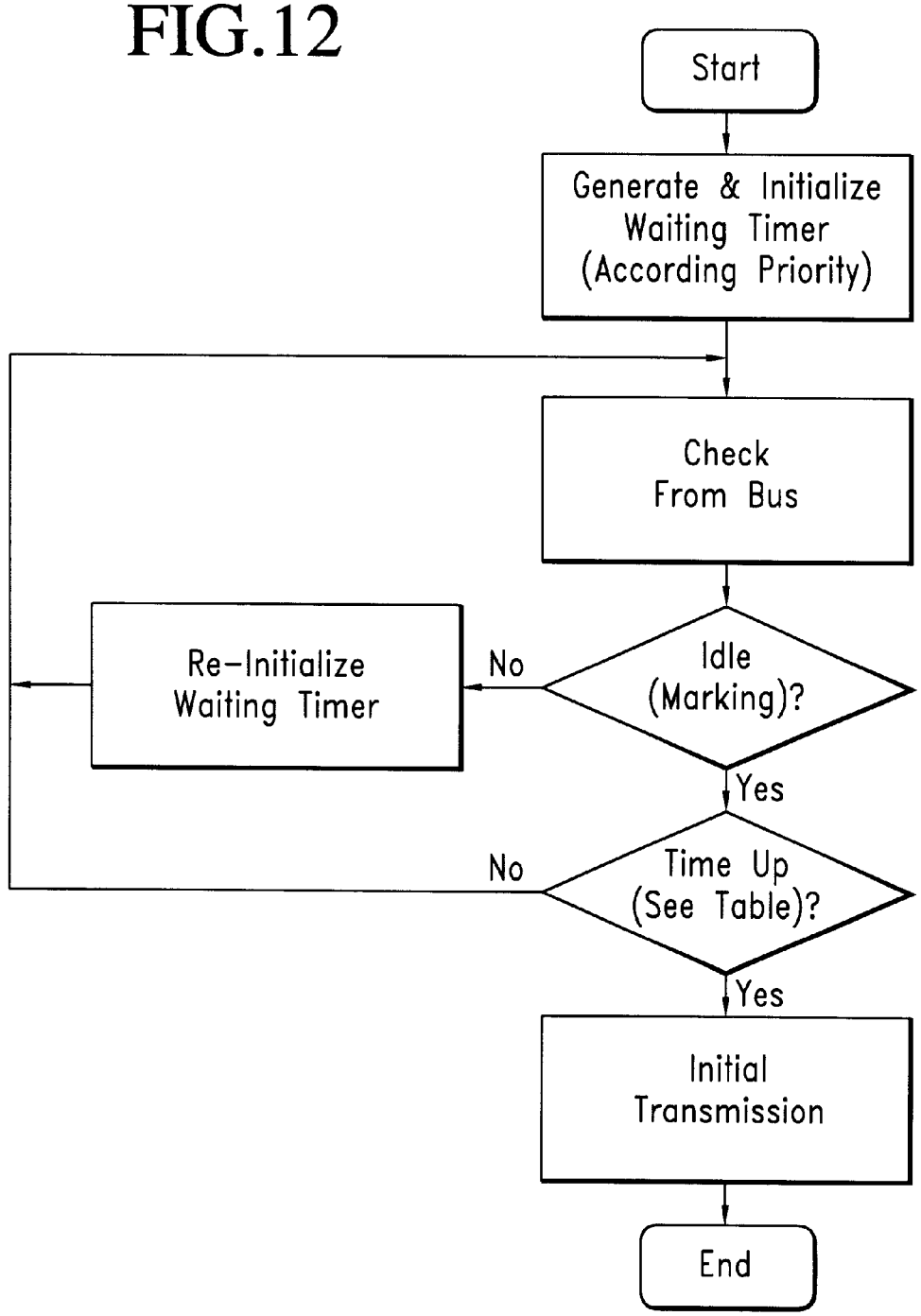
FIG. 12 is a flowchart showing the process whereby a node initials a transmission.

FIG. 12 is a flowchart showing how a node initials transmission of data packets. Before the node starts to transmit a data packet, a waiting/idle time for the transmission of that particular data packet will be generated. Such a waiting time comprises a random waiting time generated by the micro-controller or processor of the node, and a basic waiting time corresponding to the priority level assigned to it. A waiting timer is then initialized. While waiting, the node will check whether the bus is available/free for transmission. If not, the waiting timer will be re-initialized, and the checking process is carried out again. If the bus is found to be available/free for transmission, but the waiting time is not yet up, the node will keep on checking the availability of the bus for transmission. If the bus is found to be available/free for transmission, and the waiting time is up, the node will then start transmission of a data packet. The process will start again when the node seeks to transmit a second data packet, and so on. It can be seen that, as mentioned above, a node to which a higher priority level is assigned will have a higher chance of having its data packets transmitted, than a node to which a lower priority level is assigned.

The above arrangement of assigning priority levels to the nodes forming the system assists in avoiding collision in the transmission of data/signals. However, it is still possible that the respective waiting time of two or more nodes end at exactly the same time, so that they seek to transmit their own data/signals at the same time. The method discussed below is then used to prevent collision.

Figure 13:
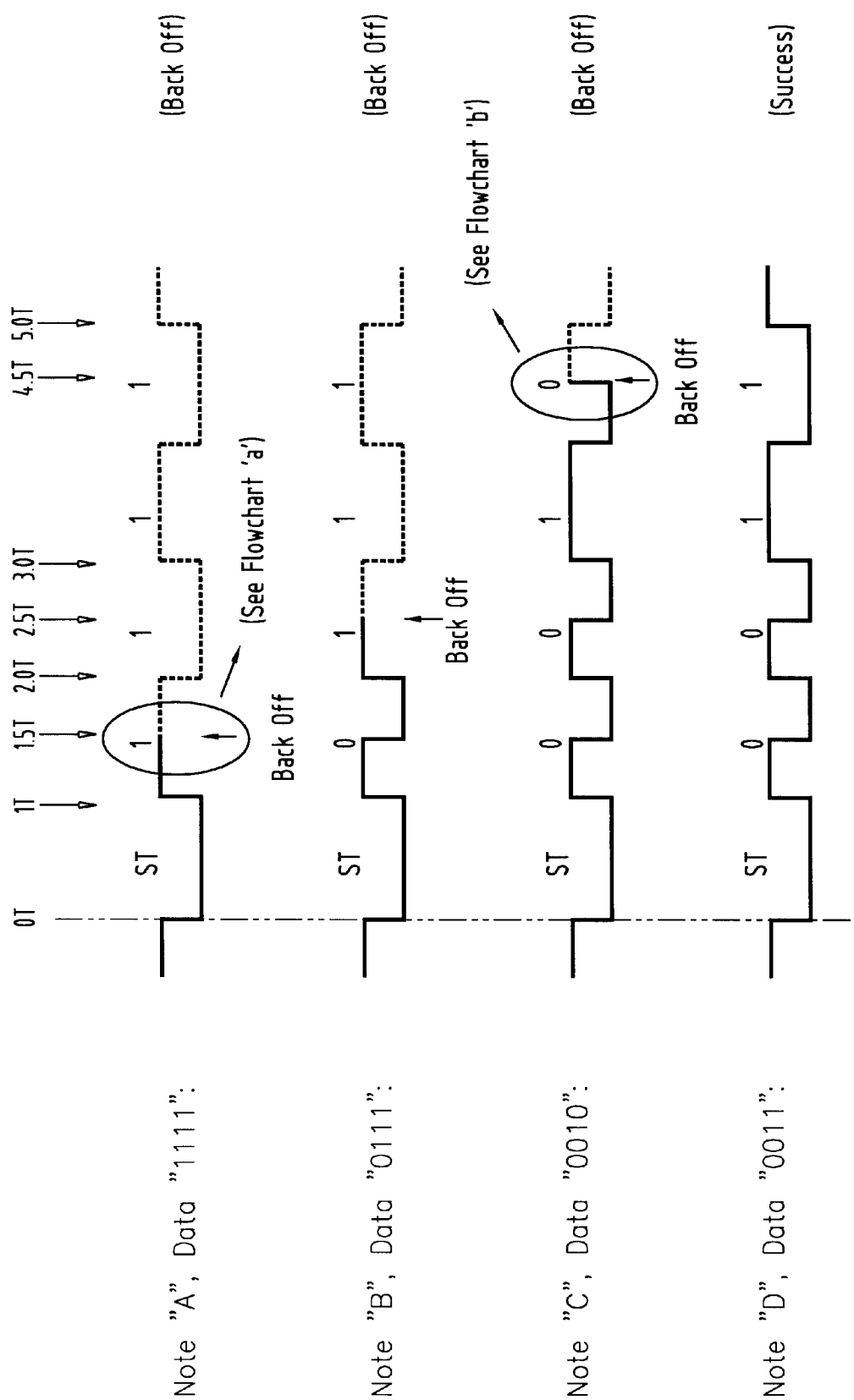
FIG. 13 is a timing chart showing a method for access control and collision avoidance according to the present invention.

As shown in FIG. 13, four nodes (A, B, C and D) having the same priority level and the same total waiting time seek to transmit a respective data packet at the same time. For the purpose of this example only, only the start bit (ST) and first four data bits are shown. In this example, node A seeks to transmit data "1111", node B seeks to transmit data "0111", node C seeks to transmit data "0010" and node D seeks to transmit data "0011". In this connection, the flowcharts in FIGS. 14 and 15 set out the procedure whereby collision is avoided.

For a better analysis of the process of collision avoidance, let us look back at FIGS. 6 and 7. It can be seen that, in order to have a logic low on the bus, the current mode transmitter of the node must sink a current. On the other hand, in order to have a logic high on the bus, the transmitter must be cut off. This shows that the system is of the nature of a wired-AND logic. In other words, it only requires the transmitter of one node to sink a current to bring about a logic low on the bus. However, in order to have a logic high on the bus, all the transmitters of the nodes connected to the bus/transmission medium have to be cut off. As the transmitters are cut off when the relevant node is idle, we may also consider that a logic high is being transmitted into the bus in this situation.

A first node transmitting a logic high into the bus may be considered to hand out the right to control the bus. This first node then checks whether a second node(s) is also using the bus by detecting if a logic low is being transmitted into the bus. If there is such a second node(s), the first node, i.e. the node transmitting a logic high into the bus, will have to back-off, i.e. the first node will abort its own transmission, handing over the right to control the bus to the second node(s). By way of such an arrangement, the transmission of the logic low by the second node(s) is in no way affected, thus realizing collision-free transmission.

In the case of node A shown in FIG. 13, after initializing the transmission of a logic-high data bit "1" into the bus (starting from the time 1.0 T), it checks whether the bus correctly responds (a logic high). If no such logic high is found in the bus, node A will have to back-off. If, however, a logic high is found in the bus, the node will then continuously monitor whether this logic high has been transmitted for its full time duration, which is T in this instance when a logic-high data bit "1" is sought to be transmitted. If the transmission has lasted for the full time duration of T, the node will continue to send the next bit. If not, the node will have to back off, re-generate a waiting time, and wait for transmission again. In this example, although the node A seeks to transmit a logic-high data bit "1" during the time period 1.5 T to 2.0 T, as the other three nodes B, C and D are seeking to transmit a logic low, no logic high is present on the bus. The node A has to back-off, thus discontinuing the transmission of its data packet. It will then have to wait for a further time period before it can try to transmit again. For the same reason, node B has to back-off when it seeks to transmit the logic high data bit "1" during the time period of 2.5 T to 3.0 T, in view of the fact that the other two nodes C and D are seeking to transmit a logic low.

Figure 15:
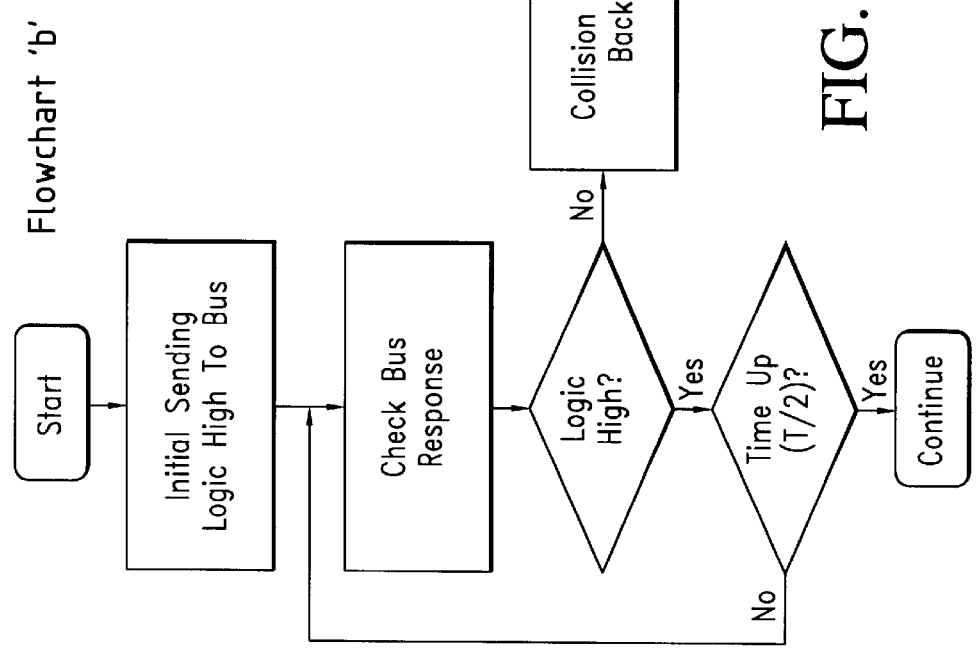
FIGS. 14 and 15 are flowcharts showing the back-off method for collision avoidance.
Figure 14:
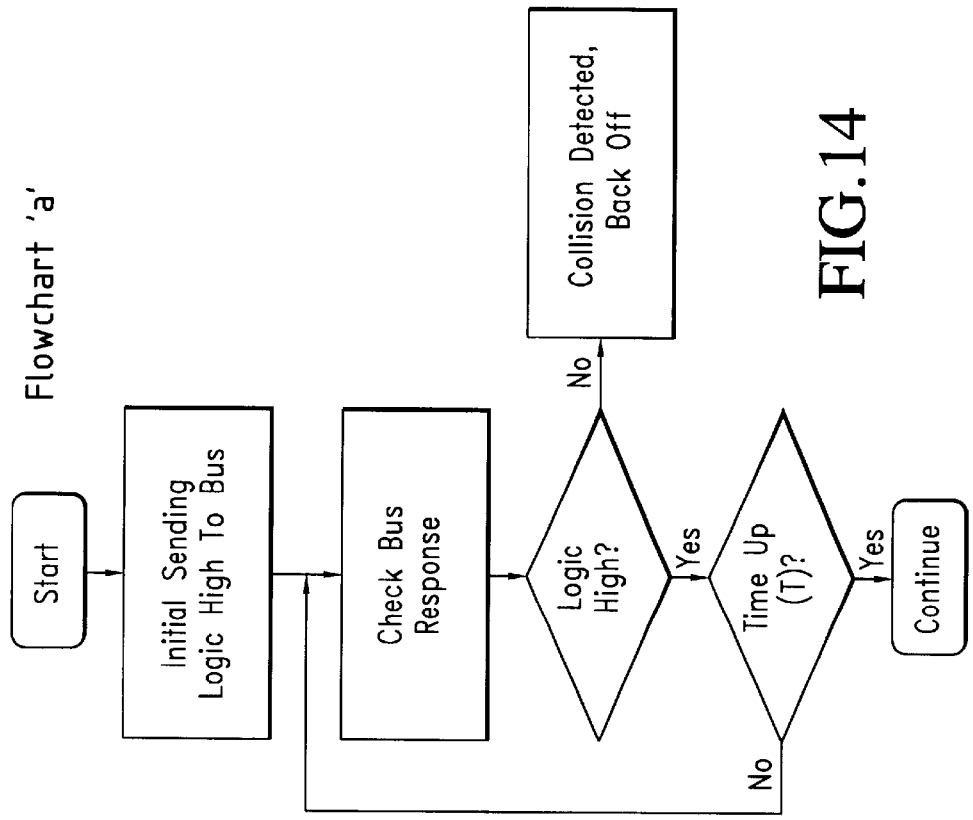

While the flowchart in FIG. 14 deals with procedure of backing-off when a node is seeking to transmit a logic high data bit "1" (e.g. node A during the time period 1.0 T to 2.0 T), the flowchart in FIG. 15 deals with the procedure of backing-off when a node is seeking to transmit the logic high part of a data bit "0". As shown in FIG. 13, when the node C seeks to transmit the final data bit "0", it has to transmit a logic high of a time duration of T/2 to the bus in order to complete the whole data bit "0", during the time period 4.5 T to 5.0 T. Again, it has to check whether a logic high is present on the bus. If not (as in this case), collision is detected and node C has to back off and discontinue its transmission of the data packet. If, however, a logic high is detected on the bus, the node C has to monitor as to whether the transmission of this logic high has lasted for a time duration of T/2. If so, it will then continue with the transmission of the next bit. If not, the node C will have to back off, re-generate a new waiting time, and wait for transmission again.

As the network in the present example is a wired-AND logic system, we have concentrated our discussion and analysis on the back-off control during the transmission of logic high. The steps for the transmission of a logic low into the bus by a node are as follows. The node seeking to transmit a logic low into the bus first checks the status of the bus to ensure that such is available for transmission. If a logic high is detected on the bus, the node transmits the logic low into the bus for the full period of the logic-low time-width. If, however, no logic high is detected on the bus, the node will stop transmission and back off.

As can be seen in FIG. 13, although the four nodes A, B, C, D seek to transmit a respectively different data packet into the bus at the same time, at least one node (the node D in this example) can successfully transmit its data packet. To node D, it transmits its data signals as if no other node is transmitting at the same time.

We can see from the above analysis that this system constitutes a wired-AND logic system, and collision-free communication is realized through back-off control during the transmission of logic high into the bus. It is, however, possible to change the whole system into a wired-OR logic system by changing the current mode transmitter from a sink current transmitter to a source current transmitter. This means that a positive pulse will be on the bus provided the source current transmitter of at least one node transmits. However, the transmitters in all the nodes have to be cut off together if a negative pulse is to be on the bus, or if the system is to be in the idle state. In such a wired-OR system, it is possible to realize collision-free communication by performing back-off control during the transmission of logic low into the bus, in a manner similar to the backing-off during the transmission of logic high signals into the bus in a wired-AND logic system.

Figure 16:
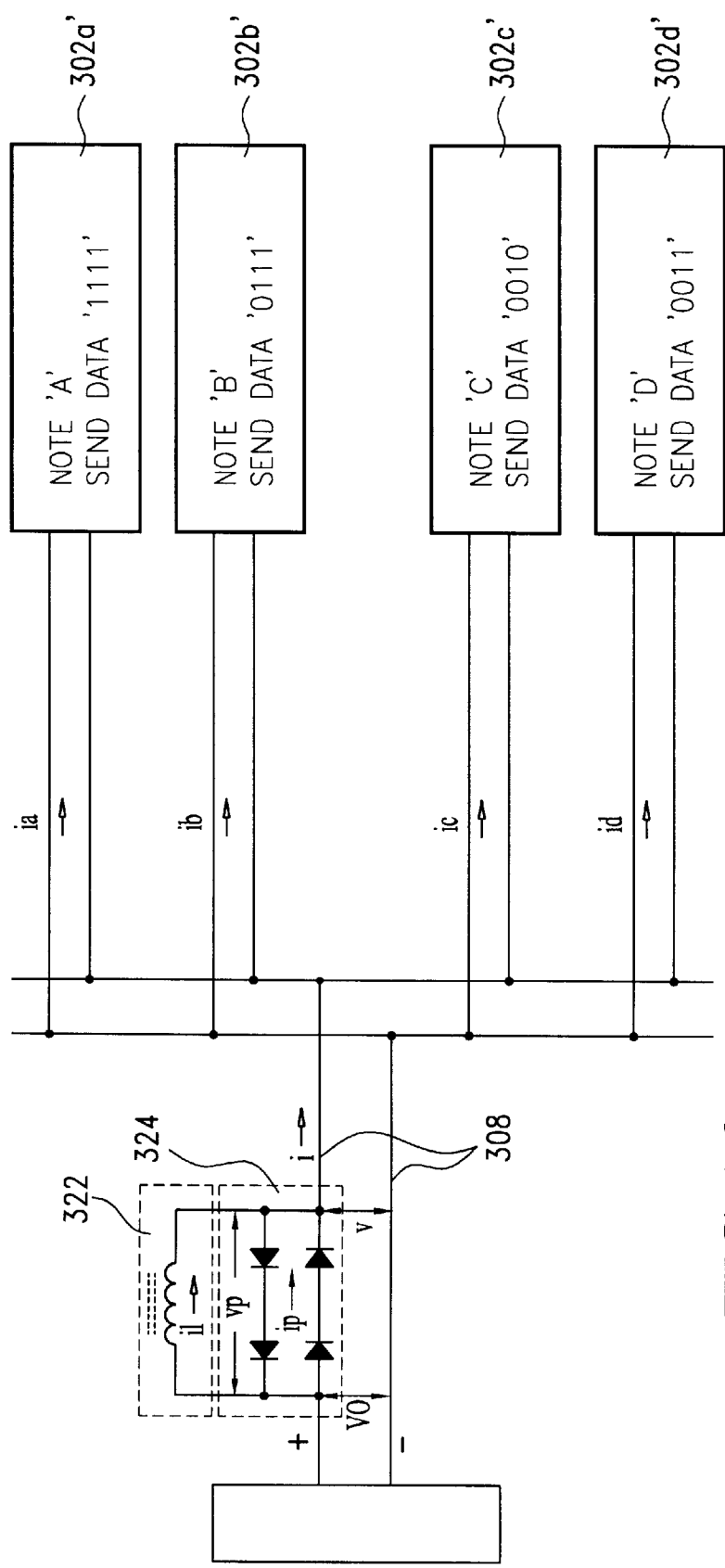
FIG. 16 is a schematic block diagram showing a four-node system according to the present invention, in which the four nodes attempt to transmit signals/data simultaneously.

FIG. 16 is a schematic drawing of a four-node system in which the situation shown in FIG. 13 occurs, and FIGS. 17A to 24 show the change of the current/voltage at/across various locations in the system. FIGS. 17A to 17D show the waveform of the respective voltage $v_a$, $v_b$, $v_c$ and $v_d$ at the micro-controller/processor output (O/P) of each of the four nodes A, B, C and D over time. As the transmitter constitutes an inverter in terms of logic, we can see that the waveforms in FIGS. 17A to 17D are opposite to that shown in FIG. 13. It can be seen that, of these four nodes A, B, C and D, only node D can successfully output all the data bits which it seek to transmit.

FIGS. 18A to 18D show the waveform of the respective sink current $i_a$, $i_b$, $i_c$ and $i_d$ entering each respective node over time. Each sink current ($i_a$, $i_b$, $i_c$, $i_d$) includes a basic current ($I_a$, $I_b$, $I_c$, $I_d$) and a transmitter current ($I_t$). It can be seen that there is a surge of the sink current ($i_a$, $i_b$, $i_c$, $i_d$) whenever a negative pulse is transmitted into the bus by the relevant node. As the node A 302$a'$ cannot successfully transmit the first data bit "1", there is only a surge of the inflow of the sink current $i_a$ from $I_a$ to $I_a+I_t$ when the start bit is successfully transmitted, in which $I_a$ is the basic system current flowing into the node A when it is not transmitting. As to the node B 302$b'$, and as shown in FIG. 18$b$, as it can only successfully transmit the first data bit "0", there is only a corresponding increase in current inflow ($i_b$) from $I_b$ to $I_b+I_t$ when the start bit and the first data bit "0" are transmitted, in which $I_b$ is the basic system current flowing into the node B when it is not transmitting. FIGS. 18C and 18D show the change of the current $i_c$ and $i_d$ flowing into the node C 302$c'$ and D 302$d'$ respectively.

FIGS. 19A to 19D show the waveform of the input (I/P) voltage ($v_a$, $v_b$, $v_c$, $v_d$) of the respective micro-controller/processor 310 of each of the nodes A, B, C and D. It can be seen that all micro-controllers/processors 310 receive the same series of electrical pulses, which correspond to the electrical pulses transmitted by the node D as indicated in FIG. 16, meaning that all these nodes A, B, C and D receive the data transmitted by the node D only, and such are the only data that can be transmitted successfully into the bus 308.

Figure 20:
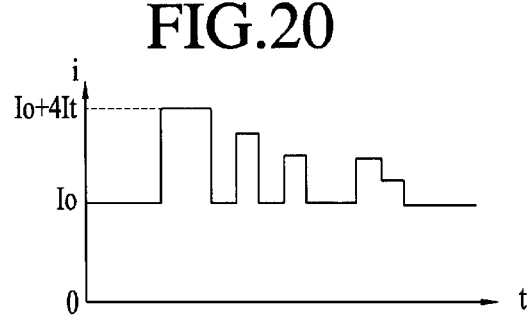
FIG. 20 shows the waveform of the DC supply source current i of the system shown in FIG. 16.
Figure 21:
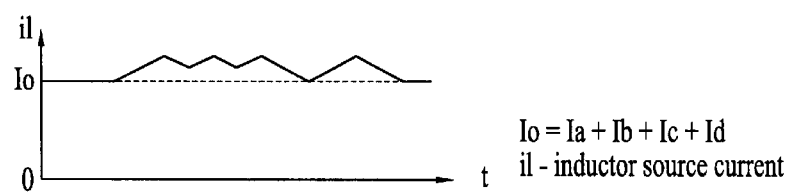
FIG. 21 shows the waveform of the inductor source current $i_l$ of the system shown in FIG. 16.

The waveform of the total DC current i on the bus over time is shown in FIG. 20. The total DC current i on the bus at any time is, in this example, the sum total of $i_a$, $i_b$, $i_c$ and $i_d$ (see FIGS. 18A to 18D) at that time. The maximum value of i is equal to $I_0+4I_t$ (assuming that the transmitter current of each of these four nodes is $I_t$ and all the nodes are transmitting the start bit simultaneously) in which $I_0$ is the total current flowing through the system when no node is transmitting, and is the sum total of $I_a$, $I_b$, $I_c$ and $I_d$ in this example. As to the electric current $i_l$ flowing through the inductor 322 at any given point of time, such is shown in FIG. 21. It can be seen that this current $i_l$ is always no less than $I_0$ and no more than $I_0+I_t$, and varies in accordance with the electric voltage $v_p$ across the bi-directional clamp 324 (to be discussed below).

Figure 22:
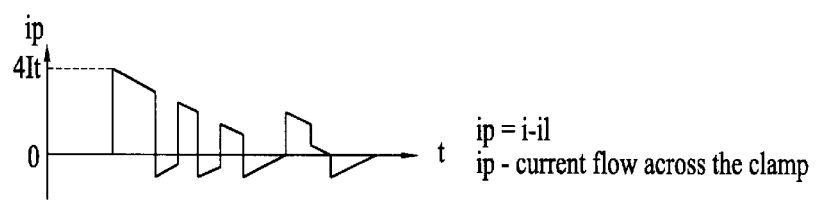
FIG. 22 shows the waveform of the current $i_p$ flowing through the bi-directional clamp of the system shown in FIG. 16.
Figure 23:
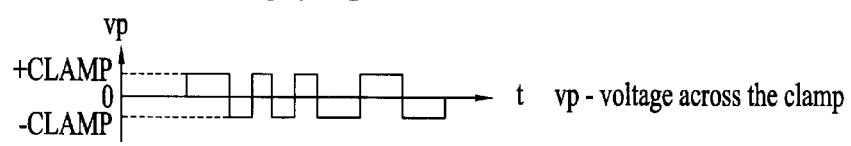
FIG. 23 shows the waveform of the voltage $v_p$ across the bi-directional clamp of the system shown in FIG. 16.
Figure 24:
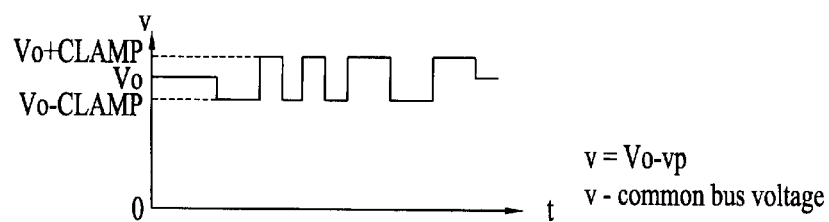
FIG. 24 shows the waveform of the bus voltage v of the system shown in FIG. 16.

As to the current $i_p$ flowing through the bi-directional voltage clamp 324, such is shown in FIG. 22. Its maximum value is $4I_t$ when all four nodes A 302$a'$, B 302$b'$, C 302$c'$ and D 302$d'$ are transmitting the start bit of their respective data packet. It can be seen that $i_p$ may sometimes be of a negative value. Such means that the current $i_p$ is flowing in a direction opposite to that as shown in FIG. 16, and thus through the upper pair of diodes in the voltage clamp 324. As to the voltage $v_p$ across the bi-directional voltage clamp 324, such is shown in FIG. 23, and it fluctuates between a positive "clamp voltage" and a negative "clamp voltage". As to the voltage v in the bus 308, such is shown in FIG. 24, as fluctuating between $V_0$+Clamp Voltage and $V_0$–Clamp Voltage, in which $V_0$ is the electric potential of the DC power source 320.

We can therefore see that, when the current mode transmitter 304 transmits, an AC component of an amplitude of ±Clamp Voltage is superimposed on the DC voltage, thus realizing the conversion of electric current into electric voltage. In addition, the amplitude of the electric voltage does not depend on the value of the electric current in the transmitter, so that the amplitude of the electric voltage is not affected even when several nodes are transmitting at the same time.

The above analysis is made on the basis of the basic structure of the system 100 shown in FIG. 3. Stated simply, the system 100 in FIG. 3 includes a bus 104 with two wires, in which the bus 104 carries the electric power, current signals and voltage signals. The bus 104 is also polarity insensitive to the nodes 102.

Figure 25:
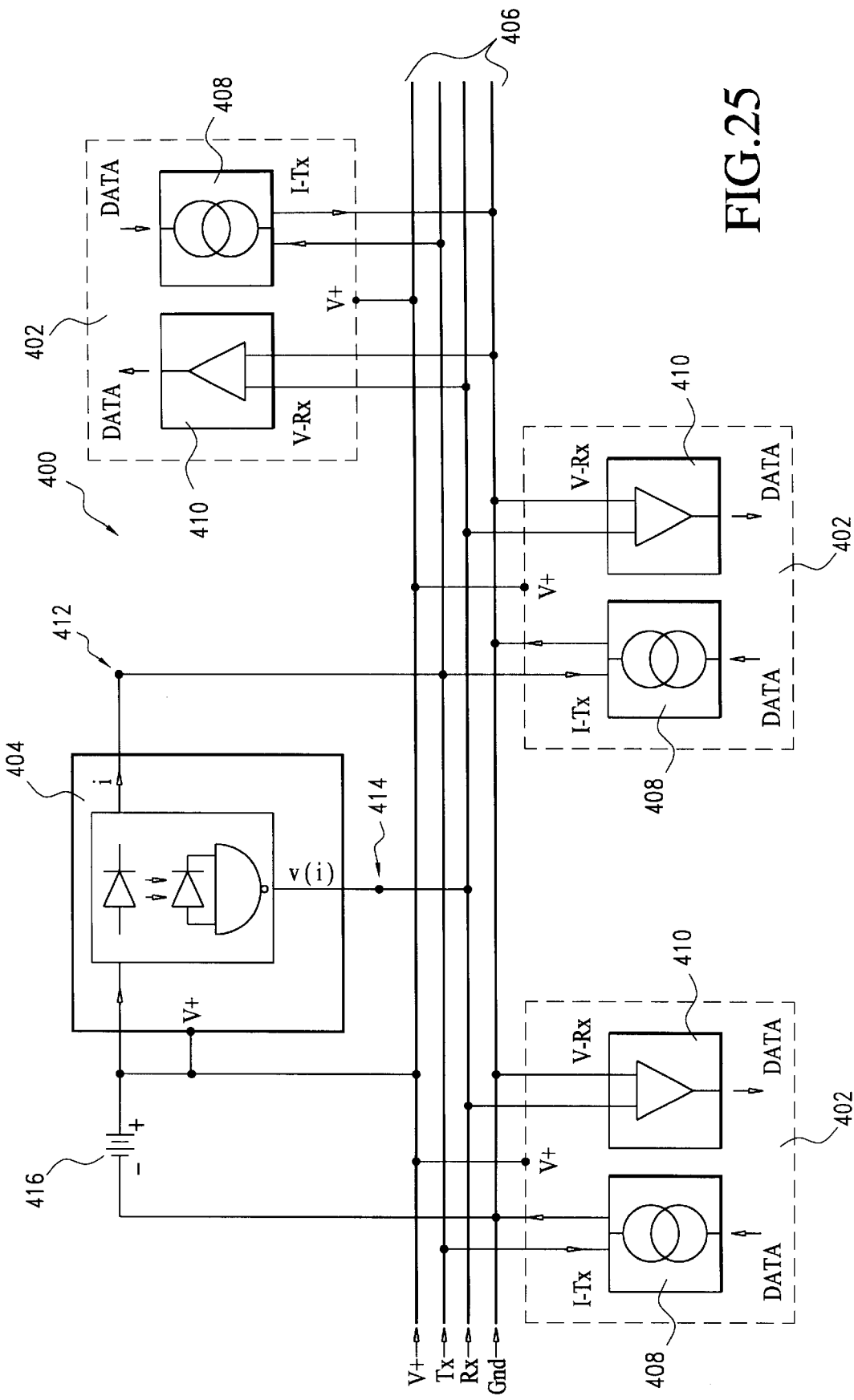
FIG. 25 is a schematic diagram of a second mixed mode multi-drop network system according to the present invention.

However, there can be variations in actual application. One may, for example, separate the power path in the bus, or separate the current path from the voltage path. FIG. 25 shows an example of such an embodiment. FIG. 25 shows a system 400 with three nodes 402 inter-connected with one another, and with a current/voltage converter 404 via a bus 406. Each of the nodes 402 is a transceiver including a current mode transmitter 408 and a voltage mode receiver 410.

The current/voltage converter 404 includes a current terminal 412 and a voltage terminal 414. The current terminal 412 of the current/voltage converter 404 is connected with the current mode transmitters 408 of the nodes 402 on the bus 406 to form a current transmission path (Tx) of the bus 406. On the other hand, the voltage terminal 414 is connected with the voltage mode receiver 410 of the nodes 402 on the bus 406 to form a voltage receiving path (Rx) of the bus 406. The nodes/transceivers 402 on the bus 406 obtain the necessary electric power from a DC power source 416 through a V+path of the bus 406. With the inclusion of a Ground path (Gnd), the bus 406 includes a total of four wires.

The current/voltage converter 404 may be realized by a current loop receiver (e.g. HCPL-4200 of Hewlett Packard). As to application module and current mode transmitter, one may adopt the structures discussed above. As it is not necessary for the voltage mode receivers 410 to isolate the DC power potential from the bus, no input capacitor is required.

As discussed above, one of the major advantages of separating the power path from the signal path is that the current controller 108 shown in FIG. 3 is no longer required. On the other hand, one of its major disadvantages is that, with the increase in the number of wires in the bus 406, not only is it not possible to realize polarity insensitivity, the chance of mis-wiring will also increase.

Apart from the increase in the number of wires in the bus 406, there is not much difference in the nature of the system 400 with that as shown in FIG. 3. This system 400 also supports the simultaneous transmission of signals by more than one node 402, and is still a real-time-response and wired-AND logic system. The priority setting and collision-free communication method discussed above can also be implemented in this system 400.

It is clear from the foregoing discussions that a mixed mode multidrop network system according to the present invention possesses the following advantages and characteristics:

A. Such a network system successfully combines the advantages of voltage mode networks and current loop systems. As the receivers in such a network system have a high impedance, and the bus in the network exhibits a low impedance, DC can flow through the system almost without resistance (which enhances the operation of a link power system), the interference of AC of 50/60 Hz can be effectively filtered. Such characteristics are particularly important for a control system. Thus, in the field of control, the use of a mixed mode network according to the present invention is more advantageous.

B. Such is a link power network system, allowing the simultaneous distribution of power and signals/data along the same twisted pair wire. Such allows easy installation by the users, and enhances the integration of the nodes with the network. In such a system, electric power is coupled from the bus using a constant current source. Such a coupling method is of a high impedance, thus causing minimal effect on the signals/data in the bus. In addition, the transceivers in such a system are connected directly to the bus, thus avoiding the use of transformers. Such will reduce the size and cost of the system, and can enhance its reliability.

C. Such a system adopts the simplest and most common single unshielded twisted pair (UTP) wire as the bus/transmission medium. As there are only two wires and they are not of any polarity (because of the bridge rectifier 230, 232 shown in FIG. 4 and discussed above), the possibility of mis-wiring does not exist in this system, and such allows convenient installation and wiring.

D. Such is a decentralized network system in which each node can function independently. It is thus relatively easy to expand the system. In addition, the present network system is a zero dominion system (i.e. a non-master/slave or non-announcer/listener structure) in which each node may be a master/announcer, and may also be a slave/listener. Each node listens to the bus all the time and can, according to its needs, transmit signals/data into the bus.

E. Such a network system adopts a random access control method, in which any node is allowed to transmit when the bus/transmission medium is free (subject to the control of priority setting). Polling is not required in the present invention. Such enhances the efficiency of communication within the system, and the versatility of the nodes.

F. In order to achieve the collision-free communication in the present invention, the present system possesses a number of characteristics:

(a) an appropriate network structure—the network structure in the present system ensures that even in case of multiple simultaneous access, the digital signals in the transmission media will still present a predetermined logic state, i.e. no uncertain logic state will exist and all logic states can be effectively identified;

(b) an access control mechanism of immediate response—the receiver and transmitter in each of the nodes are controlled directly by a micro-controller or processor, which can ascertain the state of the bus on a real-time basis.

When a node detects a collision, it can back-off in time; and (c) appropriate data format and communication protocol.

G. In such a system, even if more than one node transmit different data packets at the same time, at least one node will successfully transmit its whole data packet, thus realizing collision-free transmission.

H. In such a system, a number of different priorities are established. During a period of busy communication, a node to which a higher priority is assigned will have a higher chance of being able to transmit its data/data packets.

I. Such a system is suitable for use in carrying out sensing, communication and control functions.

What is claimed is:

1. A digital data communication network system including a power supply means and at least two nodes, at least one pulse generating means, wherein said power supply means and said nodes are connected to one another via a transmission media whereby digital signals/data are transmissible between said nodes, wherein said power supply means supplies electric power to said nodes, wherein at least one of said nodes includes a current mode transmitter and at least one of said nodes includes a voltage mode receiver and wherein electric current from said power supply means passes through said pulse generating means to induce a voltage pulse.

2. The system according to claim 1 wherein said pulse generating means comprises a current to voltage converter means.

3. The system according to claim 2 wherein said current to voltage converter means is connected in parallel to a current controller.

4. A digital data communication system for delivering digital signals from a current mode transmitter to a voltage mode receiver, said system including:

an electrically conductive cable coupling said transmitter and said receiver with each other, thereby providing a digital data communication path;

DC power supply means for producing a pre-determined electric potential, said power supply means having a first voltage terminal and a second voltage terminal;

current control means coupling said first voltage terminal of said power supply means to said cable for providing a first electric current path, said first electric current path operating as a low impedance path for DC current;

voltage control means connected in parallel with said current control means for controlling a voltage amplitude across said current control means, and for providing a second electrical path for transient electric current;

connecting means coupling said second voltage terminal of said power supply means to said cable to provide a power distribution path;

wherein said current mode transmitter is coupled to said cable for implementing a current loop, wherein said transmitter produces current pulses in said current loop to perform a current mode digital data transmission; and wherein said voltage mode receiver is coupled to said cable for receiving voltage pulses on said cable produced by said voltage control means to perform a voltage mode digital data reception.

5. The system according to claim 4 wherein said conductive cable comprises a single twisted pair wire.

6. The system according to claim 4 wherein said current control means comprises a cored inductor.

7. The system according to claim 4 wherein said voltage control means comprises a bi-directional voltage clamp.

8. The system according to claim 4 wherein said pre-determined electric potential is substantially 24 volts.

9. The system according to claim 4 wherein each of said current mode transmitter and said voltage mode receiver includes:
   a bridge rectifier having two terminals coupled to said cable for providing a non-polarity interface with said cable, said rectifier further including a + terminal and a − terminal;
   a constant current source having a first current terminal and a second current terminal, wherein said first current terminal is coupled to said + terminal; and
   a zener diode coupling said second current terminal of said constant current source to said − terminal of said rectifier to provide a power supply to said transmitter and said receiver.

10. The system of claim 9 wherein said transmitter further includes:
    a transistor with a collector coupled to said + terminal of said rectifier, a base for inputting data to be transmitted into said transistor, and an emitter; and
    a resistor coupling said emitter of said transistor and said − terminal of said rectifier for implementing a transmission output current loop.

11. The system according to claim 9 wherein said receiver includes an input capacitor for isolating the direct current potential on said + terminal of said bridge rectifier.

12. A digital data communication network system for distributing power and for providing signal passing capabilities through a bus, said network including:
    a plurality of nodes each including a mixed mode data bus transceiver for generating electric current pulses and receiving electric voltage pulses;
    an electrically conductive cable coupling said nodes with one another to provide a path for power delivery and data communications;
    a DC power supply means for producing a predetermined electric potential, said power supply means having a first voltage terminal and a second voltage terminal;
    current control means coupling said first voltage terminal of said power supply means to said cable for providing a first DC current low impedance path;
    voltage control means connected in parallel with said current control means for controlling the voltage amplitude across said current control means and providing a second current path for transient current; and
    connection means coupling said second voltage terminal of said power supply means to said conductive cable to provide a power distribution path.

13. The system according to claim 12 wherein said conductive cable comprises a single twisted pair wire.

14. The system according to claim 12 wherein said current control means includes a cored inductor.

15. The system according to claim 12 wherein said voltage control means includes a bi-directional voltage clamp.

16. The system according to claim 12 wherein said pre-determined electric potential is substantially 24 volts.

17. The system according to claim 12 wherein the frequency of said pulses is substantially between 5 kHz to 50 kHz.

18. The system according to claim 12 wherein each of said nodes includes a micro-controller/processor.

19. The system according to claim 12 wherein said data bus transceiver includes:
    a bridge rectifier having a first and a second connection terminal for providing a non-polarity interface with said bus, said rectifier further including a + terminal and a − terminal;
    a current mode transmitter coupled to said + terminal and said − terminal of said rectifier for implementing a current loop for producing electric current pulses to said bus to perform a current mode data transmission;
    a voltage mode receiver coupled to said + terminal and said − terminal of said rectifier, said receiver receiving voltage pulses on said bus to perform a voltage mode data reception; and
    current coupling means coupled to said + terminal and said − terminal of said rectifier for providing a regulated direct current supply to said transceiver.

20. The system according to claim 19 wherein said transceiver includes a transmitter including:
    a transistor with a collector coupled to said + terminal of said rectifier, a base for inputting data to be transmitted to the transistor, and an emitter; and
    a resistor having a first terminal coupled to said emitter of said transistor and a second terminal coupled to said − terminal of said rectifier.

21. The system according to claim 19 wherein said transceiver includes a receiver including:
    a transistor with a collector coupled to said − terminal of said rectifier through a resistor for outputting the data received from said bus, and a base; and
    a capacitor coupling said base of said transistor with said + terminal of said rectifier through a resistor for providing an AC path to said bus.

22. The system according to claim 19 wherein the current coupling means includes:
    a constant current source having a first terminal and a second terminal, wherein said first terminal is coupled to said + terminal of said rectifier for sourcing a constant current; and
    a zener diode coupling said second terminal of said constant current source and said − terminal of said rectifier for providing a regulated DC voltage source.

23. A transceiver adapted to transmit and receive digital signals on a data bus which delivers direct current power and digital data simultaneously, said transceiver including:

a bridge rectifier having two connection terminals adapted to provide a non-polarity interface with said bus, said rectifier further including a + terminal and a − terminal;

a current mode transmitter coupled to said + terminal and said − terminal of said rectifier for implementing a current loop adapted to produce electric current pulses to said data bus to perform current mode data transmission;

a voltage mode receiver coupled to said + terminal and said − terminal of said rectifier, said receiver being adapted to receive electric voltage pulses on said data bus to perform voltage mode data reception; and a current coupling means coupled to said + terminal and said − terminal of said rectifier, said current coupling means being adapted to provide a regulated direct current supply to said transmitter and said receiver and other means in said transceiver.

24. The transceiver according to claim 23 wherein said transmitter includes:

a transistor with a collector coupled to said + terminal of said rectifier and a base for inputting the data to be transmitted, and an emitter; and a resistor having a first terminal coupled to said emitter of said transistor and a second terminal coupled to said − terminal of said rectifier.

25. The transceiver according to claim 23 wherein said receiver includes:

a transistor with a collector coupled to said − terminal of said rectifier through a resistor for outputting the data received, and a base; and a capacitor coupled with said base of said transistor and said + terminal of said rectifier through a resistor, and being adapted to provide an AC path to said bus.

26. The transceiver according to claim 23 wherein said current coupling means includes:

a constant current source having a first terminal and a second terminal, wherein said first terminal is coupled with said + terminal of said rectifier and adapted for sourcing a constant current; and a zener diode coupled with said second terminal of said constant current source and said − terminal of said rectifier, and adapted to provide a regulated DC electric voltage.

27. The transceiver according to claim 26 wherein the working voltage of said zener diode in said coupling means is substantially 5 volts.

28. The transceiver according to claim 23 wherein the pre-determined DC potential of said power is substantially 24 volts.

29. The transceiver according to claim 23 wherein the range of frequency of said current and voltage pulses in said transceiver is 5–50 kHz.

30. The transceiver according to claim 23 wherein said other means includes a micro-controller/processor.

31. A method of communication in a mixed mode communication and control network system, wherein said system includes at least a first node, a second node, a power supply means, and current to voltage converter means connected with one another via a bus, comprising the steps of:

(a) generating at least a first electric pulse by said first node;

(b) transmitting said first electric pulse to said power supply means in the form of an electric current;

(c) causing a first electric current from said power supply means to pass through said current to voltage converter means to induce at least a second electric pulse; and (d) transmitting said second electric pulse into said bus.

32. The method according to claim 31 wherein said first electric pulse is generated by a micro-controller/processor.

33. The method according to claim 32 wherein said first electric pulse is generated by said micro-controller/processor upon a change in state of an application module.

34. The method according to claim 31 wherein said current to voltage converter means is connected in parallel with a current control means.

35. The method according to claim 34 wherein a second electric current passes through said current control means when said first electric current passes through said current to voltage converter means.

36. The method according to claim 35 wherein the magnitude of said second electric current passing through said current control means varies at least in part in accordance with the period of time during which said second electric current passes through said current control means.

37. The method according to claim 35 wherein the magnitude of said second electric current passing through said current control means depends at least in part on the electric voltage across said current control means.

38. The method according to claim 31 wherein the polarity of said first electric pulse is opposite to the polarity of the second electric pulse.

39. The method according to claim 31 wherein said second electric pulse is received by said second node.

40. The method according to claim 39 wherein said second node includes a voltage mode receiver for receiving said second electric pulse.

41. The method according to claim 40 wherein said voltage mode receiver of said second node includes inverter means for inverting the polarity of said second electric pulse.

42. The method according to claim 41 wherein said inverted second electric pulse is inputted into a micro-controller/processor of said second node.

43. A transceiver adapted to transmit and receive digital signals/data via a mixed mode bus which delivers direct current power and digital data simultaneously, said transceiver including current mode transmitter means for implementing a current loop adapted to produce electric current pulses to said bus to perform a current mode data transmission, voltage mode receiver means for receiving electric voltage pulses on said bus to perform voltage mode data reception and bridge rectifier means for providing a polarity insensitive interface with said bus.

44. A transceiver adapted to transmit and receive digital signals/data via a mixed mode bus which delivers direct current power and digital data simultaneously, said transceiver including current mode transmitter means for implementing a current loop adapted to produce electric current pulses to said bus to perform a current mode data transmission, voltage mode receiver means for receiving electric voltage pulses on said bus to perform voltage mode data reception and current coupling means for providing a regulated direct current source.

45. The transceiver according to claim 44 wherein said current coupling means comprises a constant current source connected in series with a zener diode.

* * * * *

UNITED STATES PATENT AND TRADEMARK OFFICE
CERTIFICATE OF CORRECTION

PATENT NO. : 6,553,076 B1
DATED : April 22, 2003
INVENTOR(S) : Geng Huang

It is certified that error appears in the above-identified patent and that said Letters Patent is hereby corrected as shown below:

Title page,
Item [73], Assignee, delete "Actpro International Limited, New Territories (HK)" and insert -- Actpro International (HK) Limited, New Territories. --

Signed and Sealed this

Tenth Day of May, 2005

JON W. DUDAS
*Director of the United States Patent and Trademark Office*